(12) United States Patent
Ishizaki et al.

(10) Patent No.: US 11,029,793 B2
(45) Date of Patent: Jun. 8, 2021

(54) TOUCH DETECTING DEVICE AND TOUCH-DETECTION CAPABLE DISPLAY DEVICE

(71) Applicant: Japan Display Inc., Tokyo (JP)

(72) Inventors: Koji Ishizaki, Tokyo (JP); Hayato Kurasawa, Tokyo (JP)

(73) Assignee: Japan Display Inc., Tokyo (JP)

( * ) Notice: Subject to any disclaimer, the term of this patent is extended or adjusted under 35 U.S.C. 154(b) by 0 days.

(21) Appl. No.: 15/862,098

(22) Filed: Jan. 4, 2018

(65) Prior Publication Data

US 2018/0196554 A1     Jul. 12, 2018

(51) Int. Cl.
| | | |
|---|---|---|
| *G06F 3/044* | (2006.01) | |
| *G06F 3/047* | (2006.01) | |
| *G02F 1/1335* | (2006.01) | |
| *G06F 3/041* | (2006.01) | |
| *G02F 1/1333* | (2006.01) | |

(52) U.S. Cl.
CPC ...... *G06F 3/0446* (2019.05); *G02F 1/133528* (2013.01); *G06F 3/047* (2013.01); *G06F 3/0412* (2013.01); *G06F 3/0443* (2019.05); *G06F 3/0445* (2019.05); *G06F 3/04184* (2019.05); *G02F 1/13338* (2013.01); *G06F 2203/04103* (2013.01); *G06F 2203/04107* (2013.01); *G06F 2203/04112* (2013.01)

(58) Field of Classification Search
CPC .......................... G06F 3/044; G06F 3/041–047
See application file for complete search history.

(56) References Cited

U.S. PATENT DOCUMENTS

| | | | |
|---|---|---|---|
| 6,528,442 B1 | 3/2003 | Kuwano et al. | |
| 2007/0040816 A1 | 2/2007 | Toyomaki | |
| 2010/0033443 A1* | 2/2010 | Hashimoto | ........... G06F 3/0418 345/173 |
| 2012/0062511 A1 | 3/2012 | Ishizaki et al. | |
| 2012/0188201 A1* | 7/2012 | Binstead | ................. G06F 3/041 345/174 |
| 2014/0036166 A1* | 2/2014 | Kurasawa | ........... G02F 1/13338 349/12 |
| 2014/0152613 A1 | 6/2014 | Ishizaki et al. | |

(Continued)

FOREIGN PATENT DOCUMENTS

| | | |
|---|---|---|
| JP | 2007052183 | 3/2007 |
| JP | 2010-031382 A | 2/2010 |

(Continued)

OTHER PUBLICATIONS

Japanese Office Action dated Aug. 18, 2020 in corresponding Japanese Application No. 2017-001446.

*Primary Examiner* — Hang Lin
(74) *Attorney, Agent, or Firm* — K&L Gates LLP

(57) ABSTRACT

A touch detecting device and a touch-detection capable display device are provided each including: a substrate; a touch detection electrode provided on a plane parallel to the substrate and including a plurality of metal wires; a first conductive layer overlapping the metal wires in contact therewith and provided between the substrate and each of the metal wires in a direction perpendicular to the substrate; and a second conductive layer provided above the metal wires. At least one of the first conductive layer and the second conductive layer has a higher sheet resistance than the metal wires.

16 Claims, 17 Drawing Sheets

(56) References Cited

U.S. PATENT DOCUMENTS

| | | | | |
|---|---|---|---|---|
| 2014/0184560 A1* | 7/2014 | Adachi | ................ | G06F 3/0412 |
| | | | | 345/174 |
| 2014/0333572 A1* | 11/2014 | Hu | ......................... | G06F 3/044 |
| | | | | 345/174 |
| 2015/0370370 A1* | 12/2015 | Ikeda | ..................... | G06F 3/044 |
| | | | | 349/12 |
| 2016/0313837 A1* | 10/2016 | Zhu | ...................... | H01L 27/323 |
| 2017/0010738 A1 | 1/2017 | Kurasawa et al. | | |

FOREIGN PATENT DOCUMENTS

| | | |
|---|---|---|
| JP | 2013-142194 A | 7/2013 |
| JP | 2015172953 | 10/2015 |
| JP | 2016004183 | 1/2016 |
| JP | 2016-126348 A | 7/2016 |
| JP | 2016-136227 | 7/2016 |

\* cited by examiner

TOUCH DETECTING DEVICE AND TOUCH-DETECTION CAPABLE DISPLAY DEVICE

CROSS-REFERENCE TO RELATED APPLICATIONS

This application claims priority from Japanese Application No. 2017-001446, filed on Jan. 6, 2017, the contents of which are incorporated by reference herein in its entirety.

BACKGROUND

1. Technical Field

The present disclosure relates to a touch detecting device and a touch-detection capable display device.

2. Description of the Related Art

In recent years, what are called touch panels, that is, touch detecting devices capable of detecting an external object that has approached, have attracted attention. A touch panel is mounted on, or formed on and integrally with, a display device such as a liquid crystal display device, thereby being used as a touch-detection capable display device. Japanese Patent Application Laid-open Publication No. 2014-109904 (JP-A-2014-109904) discloses a touch-detection capable display device that, so as to have a thinner profile, a larger screen, and a higher definition, includes touch detection electrodes formed using a metal material. In the touch-detection capable display device disclosed in JP-A-2014-109904, this configuration allows for lower resistance of the touch detection electrodes and invisibility of the pattern thereof.

In the touch-detection capable display device disclosed in JP-A-2014-109904, each of touch detection electrodes has an ultrafine metal wire, and consequently has a smaller area than otherwise. For this reason, when static electricity is applied to the touch detection electrode during manufacture or use of the touch-detection capable display device, electric charge charged on the touch detection electrode is prevented from easily flowing to the outside, which is likely to deteriorate touch detection accuracy or display performance of the display device.

SUMMARY

A touch detecting device according to one aspect includes a substrate, a touch detection electrode provided on a plane parallel to the substrate and including a plurality of metal wires, a first conductive layer overlapping the metal wires in contact therewith and provided between the substrate and the metal wires in a direction perpendicular to the substrate, and a second conductive layer provided above the metal wires. At least one of the first conductive layer and the second conductive layer has a higher sheet resistance than the metal wires.

A touch-detection capable display device according to one aspect includes a touch detecting device described above, a plurality of pixel electrodes provided on a plane parallel to the substrate and arranged opposing the touch detection electrode and in a matrix, and a display function layer configured to be driven by an image signal.

DETAILED DESCRIPTION

Figure 1:
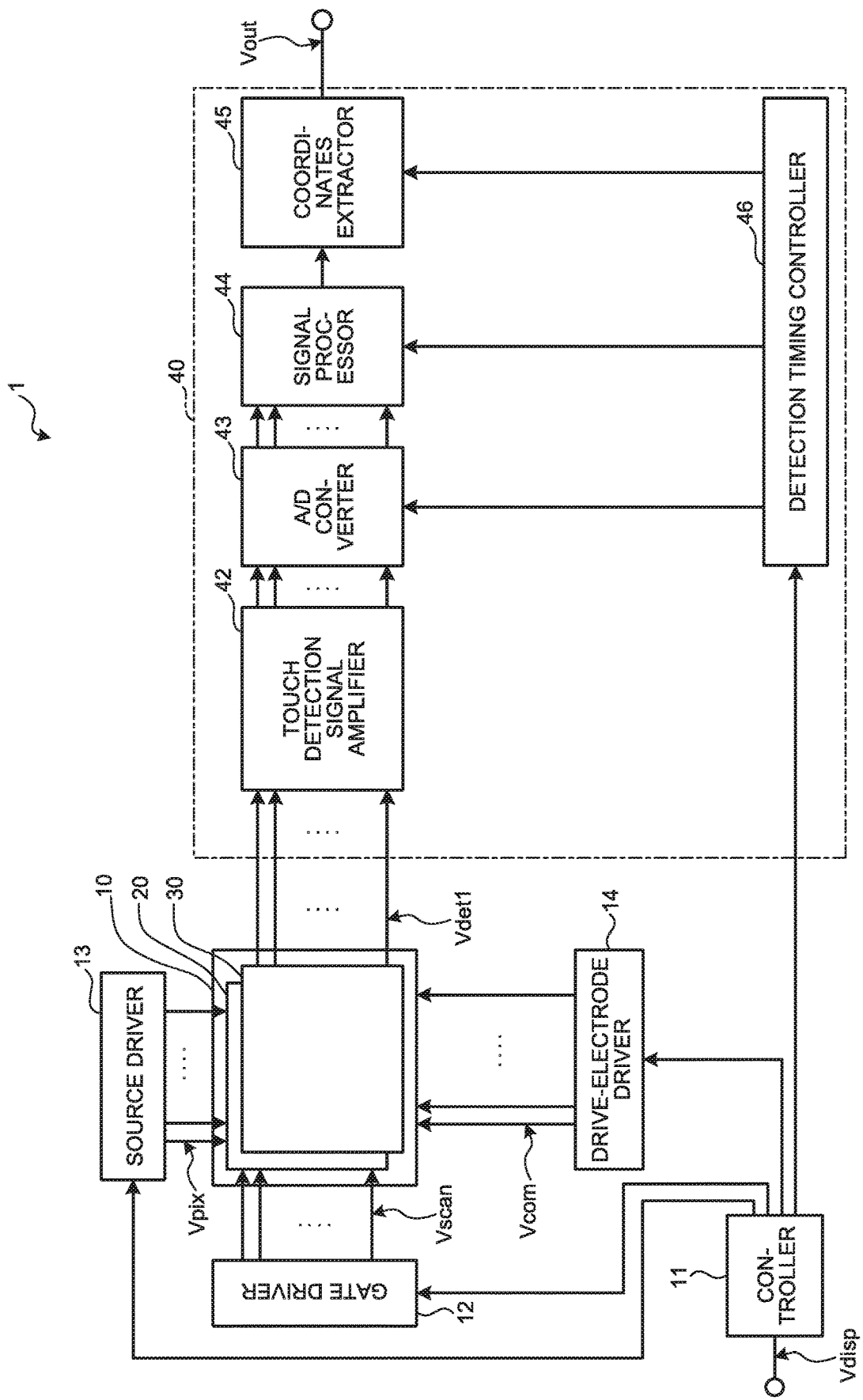
FIG. 1 is a block diagram illustrating an exemplary configuration of a touch-detection capable display device according to a first embodiment.

Modes (embodiments) for carrying out the present disclosure are described hereinbelow in detail with reference to the drawings. Descriptions of the following embodiments are not intended to limit the present disclosure. The constituent elements described below include those readily apparent to the skilled person or substantially the same. Any two or more of the constituent elements described below can be used in combination as appropriate. The disclosure is merely exemplary, and modifications made without departing from the spirit of the disclosure and readily apparent to the skilled person naturally fall within the scope of the present disclosure. The widths, the thicknesses, the shapes, or the like of certain devices in the drawings may be illustrated not-to-scale, for illustrative clarity. However, the drawings are merely exemplary and not intended to limit interpretation of the present disclosure. Throughout the description and the drawings, the same elements as those already described with reference to the drawing already referred to are assigned the same reference signs, and detailed descriptions thereof are omitted as appropriate.

First Embodiment

FIG. 1 is a block diagram illustrating an exemplary configuration of a touch-detection capable display device according to a first embodiment. As illustrated in FIG. 1, a touch-detection capable display device 1 includes a touch-detection capable display portion 10, a controller 11, a gate driver 12, a source driver 13, a drive-electrode driver 14, and a touch detector 40.

The touch-detection capable display device 1 is a display device that has a touch detection capability embedded in the touch-detection capable display portion 10. The touch-detection capable display portion 10 is a device integrally including a display panel 20 and a touch panel 30, the display panel 20 being what is called a liquid crystal display device, the touch panel 30 being a capacitive touch detecting device. Specifically, in the touch-detection capable display portion 10, some members of the display panel 20 such as electrodes and substrates double as members of the touch panel 30 such as electrodes and substrates. The touch-detection capable display portion 10 may be a device having the touch panel 30 mounted on the display panel 20. The display panel 20 may be, for example, an organic electroluminescence (EL) display panel.

The display panel 20 performs display by scanning horizontal lines one by one in accordance with a scanning signal Vscan supplied from the gate driver 12. The controller 11 is a circuit that, based on video signals Vdisp supplied from the outside, supplies control signals to and thereby control the gate driver 12, the source driver 13, the drive-electrode driver 14, and the touch detector 40, respectively, so that they can operate in synchronization with one another.

The gate driver 12 has the function of, based on control signals supplied from the controller 11, selecting each one horizontal line, as a target to be driven for display of the touch-detection capable display portion 10, in turn.

The source driver 13 is a circuit that, based on control signals supplied from the controller 11, supplies pixel signals Vpix to respective sub-pixels SPix (see FIG. 8) of the touch-detection capable display portion 10.

The drive-electrode driver 14 is a circuit that, based on control signals supplied from the controller 11, supplies drive signals Vcom to drive electrodes COML (see FIG. 9) of the touch-detection capable display portion 10. One or some of the functions of the gate driver 12, the source driver 13, and the drive-electrode driver 14 may be incorporated in the touch-detection capable display portion 10.

The touch panel 30 operates based on the basic principle of capacitive touch detection, and performs touch detecting operation based on the mutual-capacitance method (also called the mutual method). Thus, an object to be detected such as a finger can be detected when touching or having approached a display region.

The touch detector 40 is a circuit that, based on control signals supplied from the controller 11 and touch detection signals Vdet1 supplied from the touch panel 30, detects whether a touch has been made on the touch panel 30. If a touch has been made thereon, the touch detector 40 finds coordinates or the like of a position at which touch input has been made.

The touch detector 40 includes a touch detection signal amplifier 42, an analog/digital (A/D) converter 43, a signal processor 44, a coordinates extractor 45, and a detection timing controller 46. Based on control signals supplied from the controller 11, the detection timing controller 46 performs control so that the A/D converter 43, the signal processor 44, and the coordinates extractor 45 can operate in synchronization with one another.

In touch detection, the touch detection signal amplifier 42 amplifies the touch detection signals Vdet1 supplied from the touch-detection capable display portion 10. The A/D converter 43 samples analog signals output from the touch detection signal amplifier 42 at times synchronous with the detection drive signal Vcom, and converts the sampled signals into digital signals.

The signal processor 44 is a logical circuit that, based on the output signal of the A/D converter 43, detects whether a touch has been made on the touch-detection capable display portion 10. The signal processor 44 performs processing to extract a signal (an absolute value |ΔV|) corresponding to the difference between detection signals due to a finger. The signal processor 44 compares the absolute value |ΔV| with a certain threshold voltage, and determines, if this absolute value |ΔV| is less than the threshold voltage, that the object to be detected is not touching the display region. In contrast, if the absolute value |ΔV| is not less than the threshold voltage, the signal processor 44 determines that the object to be detected is touching or has approached the display region. The touch detector 40 is thus enabled to perform touch detection.

The coordinates extractor 45 is a logical circuit that, when the signal processor 44 has detected a touch, finds touch panel coordinates thereof. The coordinates extractor 45 outputs the touch panel coordinates as an output signal Vout. The coordinates extractor 45 may output the output signal Vout to the controller 11. The controller 11 is capable of executing, based on the output signal Vout, certain display operation or detection operation.

Figure 2:
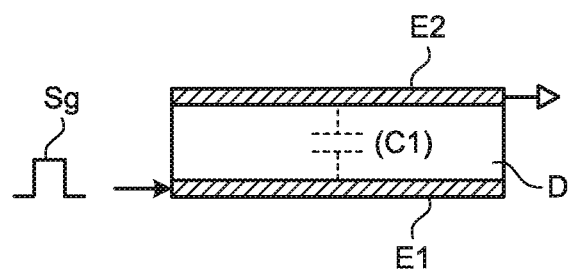
FIG. 2 is an explanatory diagram for explaining the basic principle of mutual-capacitance based touch detection, the diagram representing a state of neither being touched nor approached by a finger.
Figure 3:
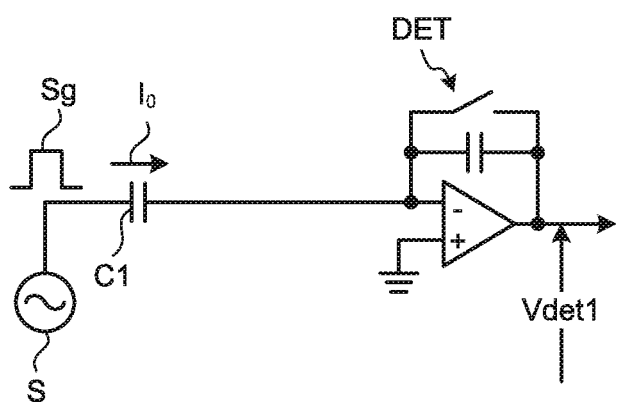
FIG. 3 is an explanatory diagram illustrating an example of an equivalent circuit for the state illustrated in FIG. 2 of neither being touched nor approached by a finger.
Figure 4:
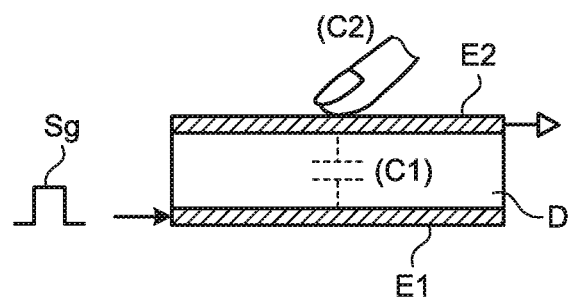
FIG. 4 is an explanatory diagram for explaining the basic principle of mutual-capacitance based touch detection, the diagram representing a state of being touched or approached by a finger.
Figure 5:
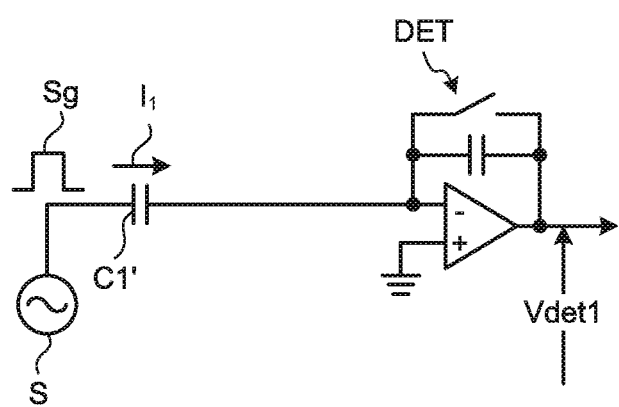
FIG. 5 is an explanatory diagram illustrating an example of an equivalent circuit for the state illustrated in FIG. 4 of being touched or approached by a finger.
Figure 6:
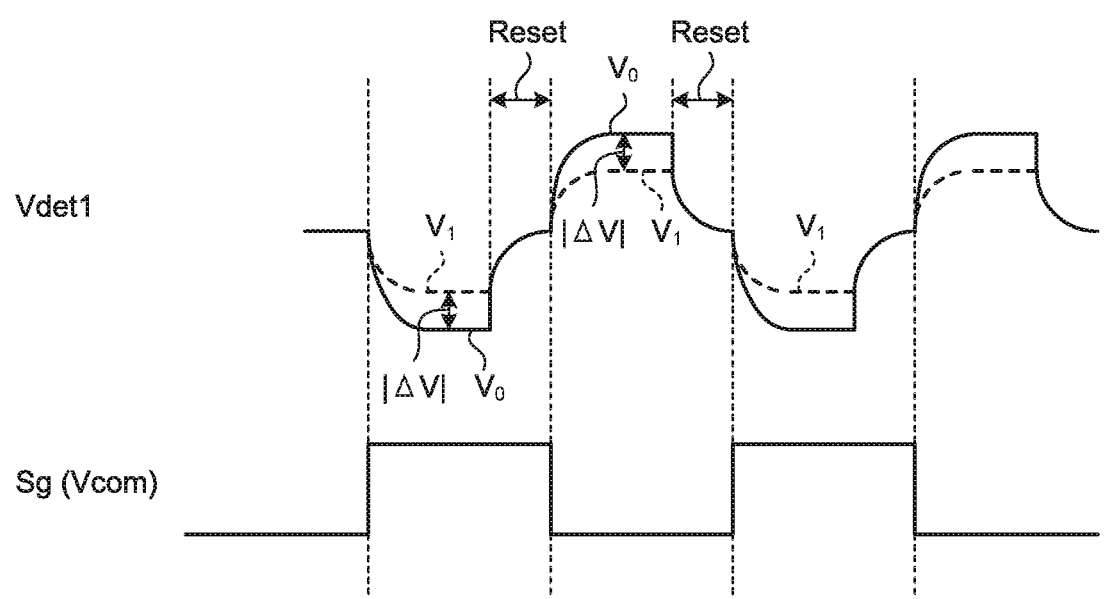
FIG. 6 is a diagram representing examples of the waveforms of a drive signal and a touch detection signal.

As described above, the touch panel 30 operates based on the basic principle of capacitive touch detection. The basic principle of touch detection according to the mutual capacitance method in the touch-detection capable display device 1 of this embodiment is described with reference to FIG. 2 to FIG. 6. FIG. 2 is an explanatory diagram for explaining the basic principle of mutual-capacitance based touch detection, the diagram representing a state of neither being touched nor approached by a finger. FIG. 3 is an explanatory diagram illustrating an example of an equivalent circuit for the state illustrated in FIG. 2 of neither being touched nor approached by a finger. FIG. 4 is an explanatory diagram for explaining the basic principle of mutual-capacitance based touch detection, the diagram representing a state of being touched or approached by a finger. FIG. 5 is an explanatory diagram illustrating an example of an equivalent circuit for the state illustrated in FIG. 4 of being touched or approached by a finger. FIG. 6 is a diagram representing examples of the waveforms of a drive signal and a touch detection signal. The following describes a case in which a finger touches or approaches the device. This case is not limiting, and the object to be detected may be any object that generates a capacitance. Examples of the object to be detected include, but are not limited to, objects including conductors such as a stylus pen.

For example, as illustrated in FIG. 2, a capacitive element C1 includes a drive electrode E1 and a touch detection electrode E2 that are disposed opposite to each other across a dielectric body D. As illustrated in FIG. 3, the capacitive element C1 has one end thereof coupled to an alternating-current signal source (drive signal source) S and has the other end thereof coupled to a voltage detector DET. The voltage detector DET is, for example, an integration circuit included in the touch detection signal amplifier 42 illustrated in FIG. 1.

When an alternating-current square wave Sg having a certain frequency (for example, roughly several to several hundred kHz) is applied from the alternating-current signal source S to the drive electrode E1 (the one end of the capacitive element C1), an output waveform (the touch detection signal Vdet1) as illustrated in FIG. 6 is detected via the voltage detector DET coupled to the touch detection electrode E2 (the other end of the capacitive element C1) side. The alternating-current square wave Sg corresponds to a drive signal Vcom input from the drive-electrode driver 14.

In the state (non-touching state) of neither being touched nor approached by a finger, current $I_0$ corresponding to the capacitance value of the capacitive element C1 flows in response to charging or discharging of the capacitive element C1, as illustrated in FIG. 2 and FIG. 3. The voltage detector DET illustrated in FIG. 3 converts, into changes of voltage (a waveform $V_0$ in a solid line (see FIG. 6)), changes of the current $I_0$ that correspond to the alternating-current square wave Sg.

In contrast, in the state (touching state) of being touched or approached by a finger, a capacitance C2 generated by the finger is touching or is in the vicinity of the touch detection electrode E2, as illustrated in FIG. 4. Consequently, some of the lines of electric force between the drive electrode E1 and the touch detection electrode E2 that correspond to a fringe are interrupted by the finger (a conductor). The capacitive element C1 thus acts as a capacitive element C1' having a capacitance value smaller than the capacitance value that the capacitive element C1 has in the non-touching state. As illustrated in FIG. 5 and FIG. 6, the voltage detector DET converts, into changes of voltage (a waveform $V_1$ in a dotted line), changes of the current $I_1$ that correspond to the alternating-current square wave Sg.

In this case, the waveform $V_1$ has smaller amplitude than the above-described waveform $V_0$. Consequently, the absolute value |ΔV| of the voltage difference between the waveform $V_0$ and the waveform $V_1$ changes depending on the influence of an object such as a finger that is touching or has approached the touch detection electrode E2 from the outside. The voltage detector DET resets charging and discharging of a capacitor, through switching in a circuit, in accordance with the frequency of the alternating-current square wave Sg. Such periods Reset are provided to enable accurate detection of the absolute value |ΔV| of the voltage difference.

The touch detector 40 compares the absolute value |ΔV| with the certain threshold voltage to determine whether the external object that has approached is not touching, or is touching or has approached the touch detection electrode E2. The touch detector 40 is thus enabled to perform touch detection based on the basic principle of mutual-capacitance based touch detection.

A capacitive touch detection method herein is not limited to the mutual-capacitance method described above, and may be the self-capacitance method (also called the self method). In such a case, either the drive electrode E1 or the touch detection electrode E2 is used in touch detection. The following example describes touch detection using the touch detection electrode E2. The alternating-current signal source S supplies, to the touch detection electrode E2, the alternating-current square wave Sg serving as a drive signal. Current corresponding to a capacitance value of the touch detection electrode E2 flows through the voltage detector DET. The voltage detector DET converts, into changes of voltage, changes of the current that correspond to the alternating-current square wave Sg.

In the non-touching state, current corresponding to a capacitance value of the touch detection electrode E2 flows. In contrast, in the touching state, a capacitance value generated between a finger and the touch detection electrode E2 is added to a capacitance value of the touch detection electrode E2. The touch detection electrode E2 thus acts as a capacitive element having a larger capacitance value in the touching state than in the non-touching state. The voltage detector DET outputs a touch detection signal Vdet2 corresponding to the change in capacitance. Consequently, the touch detector 40 can perform touch detection based on the absolute value |ΔV|.

Figure 7:
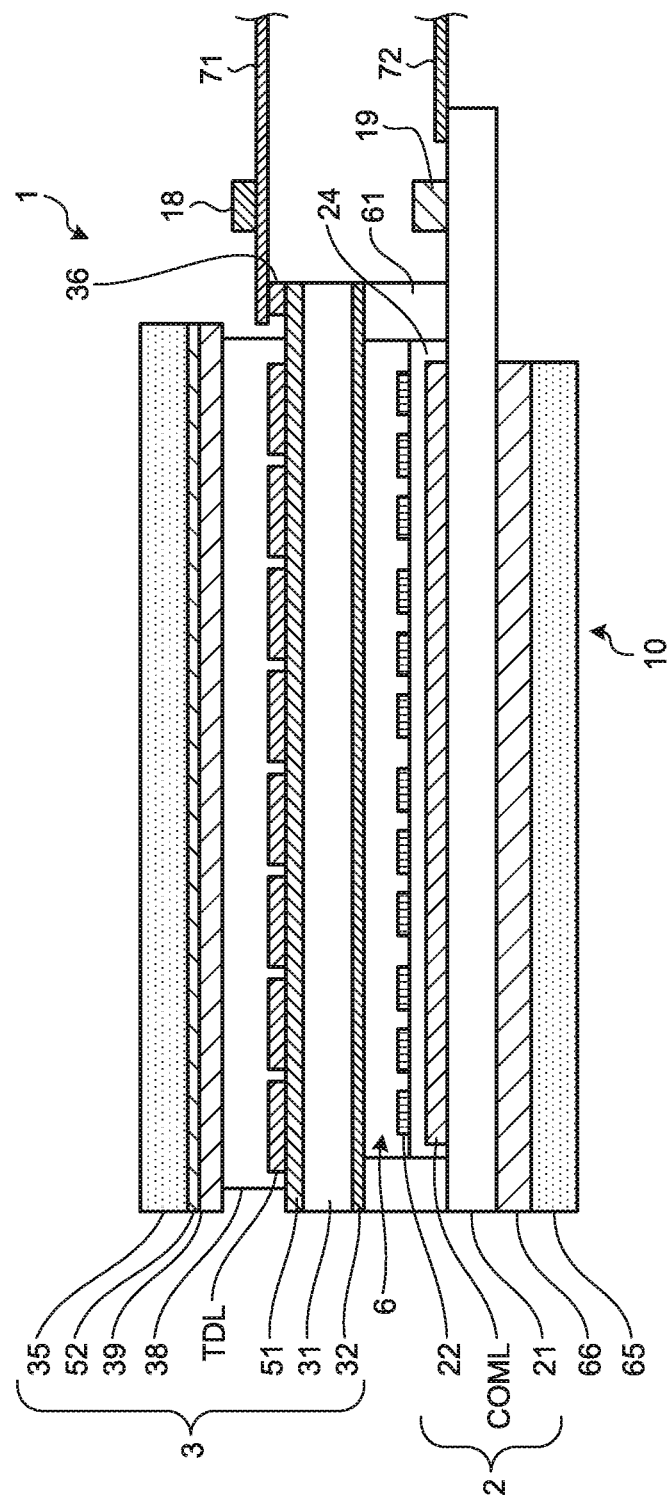
FIG. 7 is a sectional view representing a schematic sectional structure of the touch-detection capable display device.

Next, an exemplary configuration of the touch-detection capable display device 1 of this embodiment is described. FIG. 7 is a sectional view representing a schematic sectional structure of the touch-detection capable display device. As illustrated in FIG. 7, the touch-detection capable display device 1 includes a pixel substrate 2, a counter substrate 3, and a liquid crystal layer 6 serving as a display function layer. The counter substrate 3 is disposed facing the pixel substrate 2 in a direction perpendicular to a surface of the pixel substrate 2. The liquid crystal layer 6 is provided between the pixel substrate 2 and the counter substrate 3.

The pixel substrate 2 includes a first substrate 21, pixel electrodes 22, drive electrodes COML, and a polarizing plate 65. On the first substrate 21, circuits such as a gate scanner included in the gate driver 12, switching elements such as thin film transistors (TFT), and various kinds of wiring (not illustrated in FIG. 7) such as gate lines GCL and signal lines SGL are provided.

The drive electrodes COML are provided above the first substrate 21. The pixel electrodes 22 are provided above the drive electrodes COML with an insulating layer 24 interposed therebetween. While being provided in a layer different from a layer in which the drive electrodes COML are provided, the pixel electrodes 22 are disposed overlapping the drive electrodes COML in a plan view. A plurality of such pixel electrodes 22 are disposed in a matrix in a plan view. The polarizing plate 65 is provided under the first substrate 21 with an adhesive layer 66 interposed therebetween. A light-transmissive conductive material such as indium tin oxide (ITO) is used for the pixel electrodes 22 and the drive electrodes COML. While this embodiment illustrates a case in which the pixel electrodes 22 are provided above the drive electrodes COML, the drive electrodes COML may be provided above the pixel electrodes 22.

A display integrated circuit (IC) 19 and a flexible substrate 72 are provided on the first substrate 21. The display IC 19 functions as the controller 11 illustrated in FIG. 1.

As used herein, the term "above" refers to a direction from the first substrate 21 to a second substrate 31 of the directions that are perpendicular to a surface of the first substrate 21. The term "under" refers to a direction from the second substrate 31 to the first substrate 21 of the perpendicular directions. The term "plan view" refers to a view seen in a direction perpendicular to a surface of the first substrate 21. Namely, for example, in a case that "an electore provided on the first substrate is located above an insulating layer", the electroce is provided farther from the first substrate than the insulating layer, and, the insulating layer is provided closer to the substrate than the electrode. As well, in the case that "an insulating layer provided on the first substrate is located under an electrode", the insulating layer is provided closer to the substrate than the electrode, and, the electroce is provided farther from the first substrate than the insulating layer.

The counter substrate 3 includes: a second substrate 31; a color filter 32 formed on one surface of the second substrate 31; a first conductive layer 51 formed on the other surface thereof; a touch detection electrode TDL; a protective layer 38; an adhesive layer 39; a second conductive layer 52; and a polarizing plate 35. A plurality of such touch detection electrodes TDL are arranged above the second substrate 31. The touch detection electrodes TDL function as detection electrodes for the touch panel 30. A flexible substrate 71 is coupled to the second substrate 31. On the flexible substrate 71, a detection-use IC 18 is mounted. The touch detection electrodes TDL are electrically coupled to the detection-use IC 18 via terminal sections 36. The detailed configuration of the touch detection electrodes TDL is to be described later. The first conductive layer 51 is provided between the second substrate 31 and the touch detection electrodes TDL in a direction perpendicular to a surface of the second substrate 31.

Figure 10:
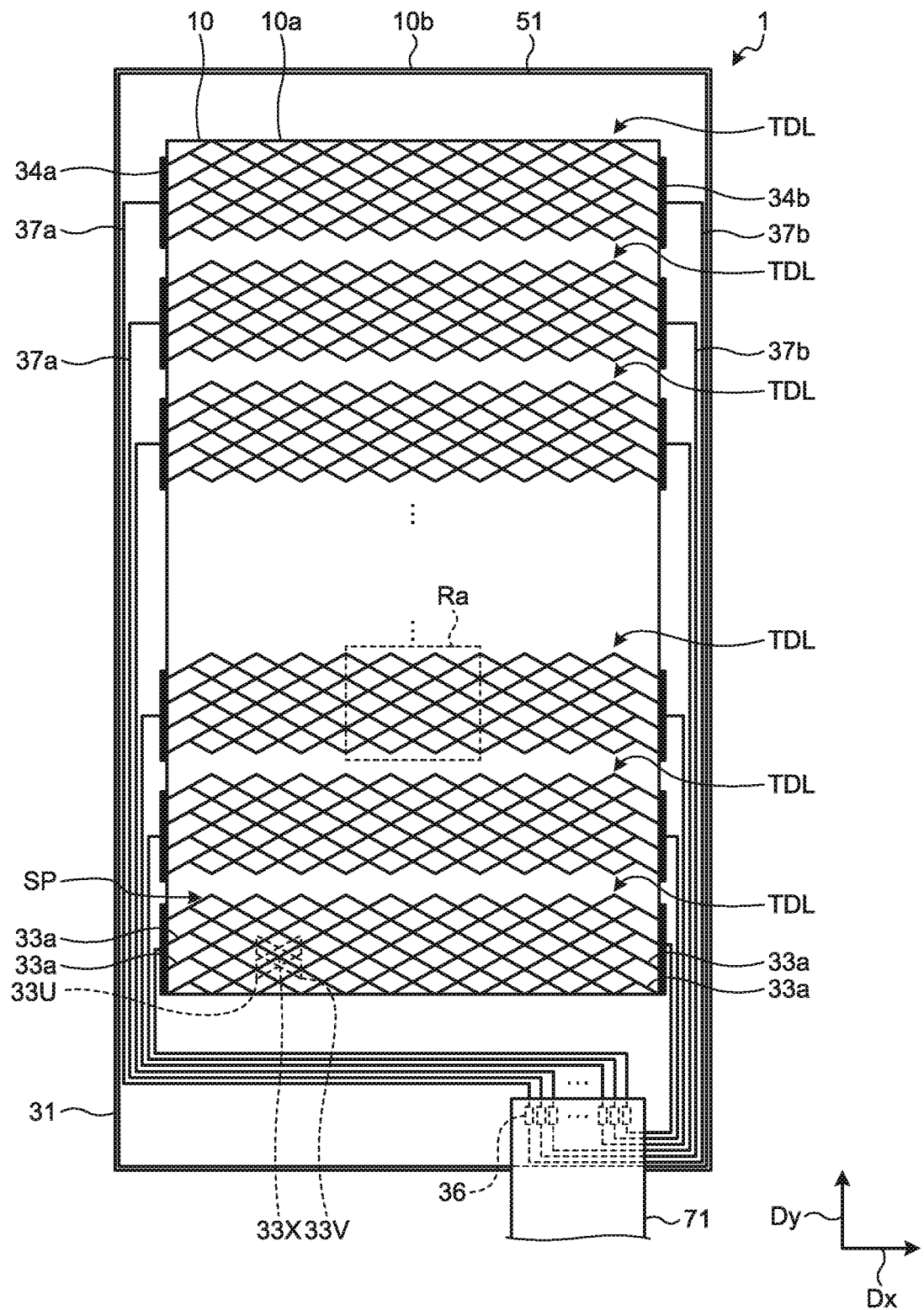
FIG. 10 is a plan view illustrating an example of a module having the touch-detection capable display device according to the first embodiment mounted thereon and illustrating an example of touch detection electrodes.

The touch detection electrode TDL includes first conductive thin wires 33U and second conductive thin wires 33V (see FIG. 10). On the touch detection electrodes, the protective layer 38 for protecting the touch detection electrodes TDL including the first conductive thin wire 33U and the second conductive thin wires 33V is provided. The protective layer 38 can be formed of a light-transmissive resin such as an acrylic resin. The polarizing plate 35 is provided above the protective layer 38 with the adhesive layer 39 interposed therebetween. The second conductive layer 52 is provided between the polarizing plate 35 and the adhesive layer 39. The adhesive layer 39 is an insulating layer having a higher resistance value than the touch detection electrodes TDL.

The first conductive layer 51 and the second conductive layer 52 are provided as a preventative measure against electro-static discharge (ESD) as described later. Each of the first conductive layer 51 and the second conductive layer 52 is a light-transmissive conductive layer, and contains at least one of ITO, indium zinc oxide (IZO), tin oxide (SnO), and a conductive organic film, for example. Each of the first conductive layer 51 and the second conductive layer 52 may include an insulating oxide in addition to at least one of the materials listed above. Each of the first conductive layer 51 and the second conductive layer 52 may be made of a light-transmissive conductive layer such as any one of the following layers disclosed, for example, in Japanese Patent Application Laid-open Publication No. 2007-148201 A and Japanese Patent Application Laid-open Publication No. 2013-142194 A: an oxide layer consisting primarily of tin dioxide ($SnO_2$) and silicon dioxide ($SiO_2$); another oxide layer consisting primarily of gallium(III) oxide ($Ga_2O_3$), indium(II) oxide ($In_2O_3$), and tin dioxide ($SnO_2$); and a light-transmissive conductive layer consisting primarily of ITO and also containing silicon (Si).

The first conductive layer 51 and the second conductive layer 52 may be formed of the same material or materials, or may be formed of different materials. For example, the first conductive layer 51 and the second conductive layer 52 may be formed of any kind of the oxide materials described above and a conductive polymer material containing polyethylenedioxythiophene (PEDOT), respectively.

Preferably, in a plan view, each of the regions within which the first conductive layer 51 and the second conductive layer 52 are provided is larger than a detection electrode region, which herein refers to a region within which the touch detection electrodes TDL are provided.

The first substrate 21 and the second substrate 31 are disposed facing each other at a certain distance from each other. A space between the first substrate 21 and the second substrate 31 is closed off by a sealing section 61. The liquid crystal layer 6 is provided in a space surrounded by the first substrate 21, the second substrate 31, and the sealing section 61. The liquid crystal layer 6 modulates, in accordance with conditions of electric fields therein, light passing therethrough; and liquid crystal of the transverse electric field mode, such as the in-plane switching (IPS) mode, is used therefor, examples of which include, but are not limited to, the fringe field switching (FFS) mode. Alignment films are disposed between the liquid crystal layer 6 and the pixel substrate 2 and between the liquid crystal layer 6 and the counter substrate 3, respectively, in the illustration of FIG. 7. In this embodiment, transverse electric fields generated between the pixel electrodes 22 and the drive electrodes COML drive the liquid crystal layer 6.

A lighting device (backlight) not illustrated is provided under the first substrate 21. The lighting device includes a light source constructed of light emitting diodes (LEDs) or the like, and shoots light from the light source toward the first substrate 21. While passing through the pixel substrate 2, light shot from the lighting device is modulated depending on the conditions of liquid crystal at positions through which the light passes, so that how light is transmitted therethrough to a display surface is varied by position. Consequently, an image is displayed on the display surface.

Figure 8:
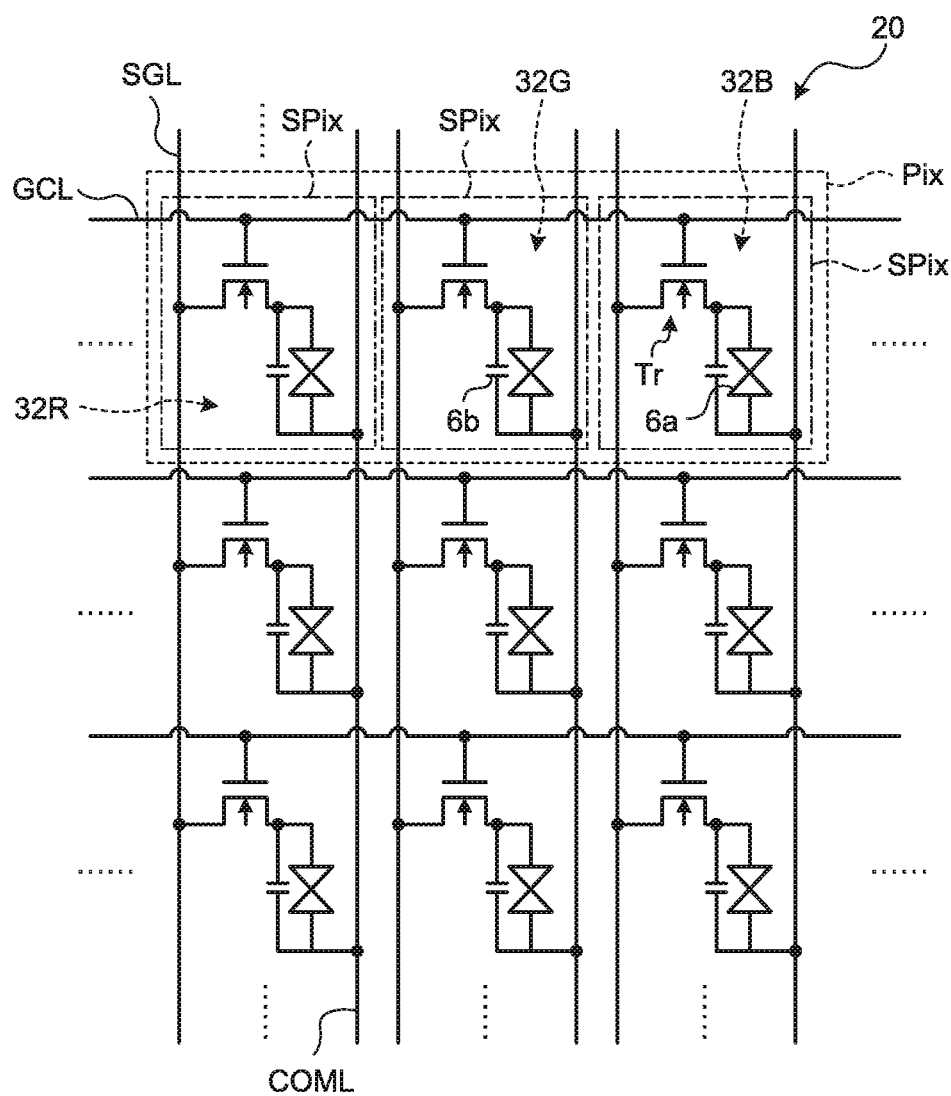
FIG. 8 is a circuit diagram representing a pixel array of the touch-detection capable display device according to the first embodiment.

Next, display operation of the touch-detection capable display device 1 is described. FIG. 8 is a circuit diagram representing a pixel array of the touch-detection capable display device according to the first embodiment. Formed on the first substrate 21 (see FIG. 7) are respective switching elements Tr of sub-pixels SPix, the signal lines SGL, the gate lines GCL, and the like, which are illustrated in FIG. 8. The signal lines SGL are wires through which pixel signals Vpix are supplied to the respective pixel electrodes 22. The gate lines GCL are wires through which drive signals for driving the respective switching elements Tr are supplied. The signal lines SGL and the gate lines GCL extend on a plane parallel to a surface of the first substrate 21.

The display panel 20 illustrated in FIG. 8 includes a plurality of sub-pixels SPix arranged in a matrix. Each of the sub-pixels SPix includes the switching element Tr and a liquid crystal element 6a. The switching element Tr is formed of a thin-film transistor and, in this example, is formed of an n-channel metal-oxide-semiconductor (MOS) thin-film transistor (TFT). The insulating layer 24 is provided between the pixel electrodes 22 and the drive electrodes COML, resulting in formation of a retained capacitance 6b illustrated in FIG. 8.

The gate driver 12 illustrated in FIG. 1 sequentially selects the gate lines GCL. The gate driver 12 applies scanning signals Vscan to gates of the switching elements Tr of the sub-pixels SPix through the selected gate line GCL. Consequently, the lines (horizontal lines) formed by the sub-pixels SPix are sequentially selected, one by one, to be driven for display. The source driver 13 supplies pixel signals Vpix to sub-pixels SPix forming the thus selected one of the horizontal lines through the signal lines SGL. These sub-pixels SPix are sequentially used for display one horizontal line by one horizontal line in accordance with the pixel signals Vpix supplied thereto.

When this display operation is performed, the drive-electrode driver 14 illustrated in FIG. 1 applies drive signals Vcomdc for display to the drive electrodes COML. The drive signal Vcomdc for display is a direct-current voltage signal used as a common potential for all of the sub-pixels SPix. Consequently, in the display operation, the drive electrodes COML function as common electrodes for the pixel electrodes 22. During the display operation, the drive-electrode driver 14 applies the drive signal Vcomdc to all of the drive electrodes COML in a display region 10a.

In the color filter 32 illustrated in FIG. 7, for example, color regions colored in three colors of red (R), in green (G), and in blue (B) may be arranged in a cyclic fashion. The respective color regions 32R, 32G, and 32B colored in the three colors, R, G, and B, form one set and correspond to the sub-pixels SPix illustrated in FIG. 8 described above. Each pixel Pix is composed of a set of the sub-pixels SPix that correspond to three differently colored color regions that are the color regions 32R, 32G, and 32B. The color filter 32 may include color regions colored in four or more colors.

Figure 9:
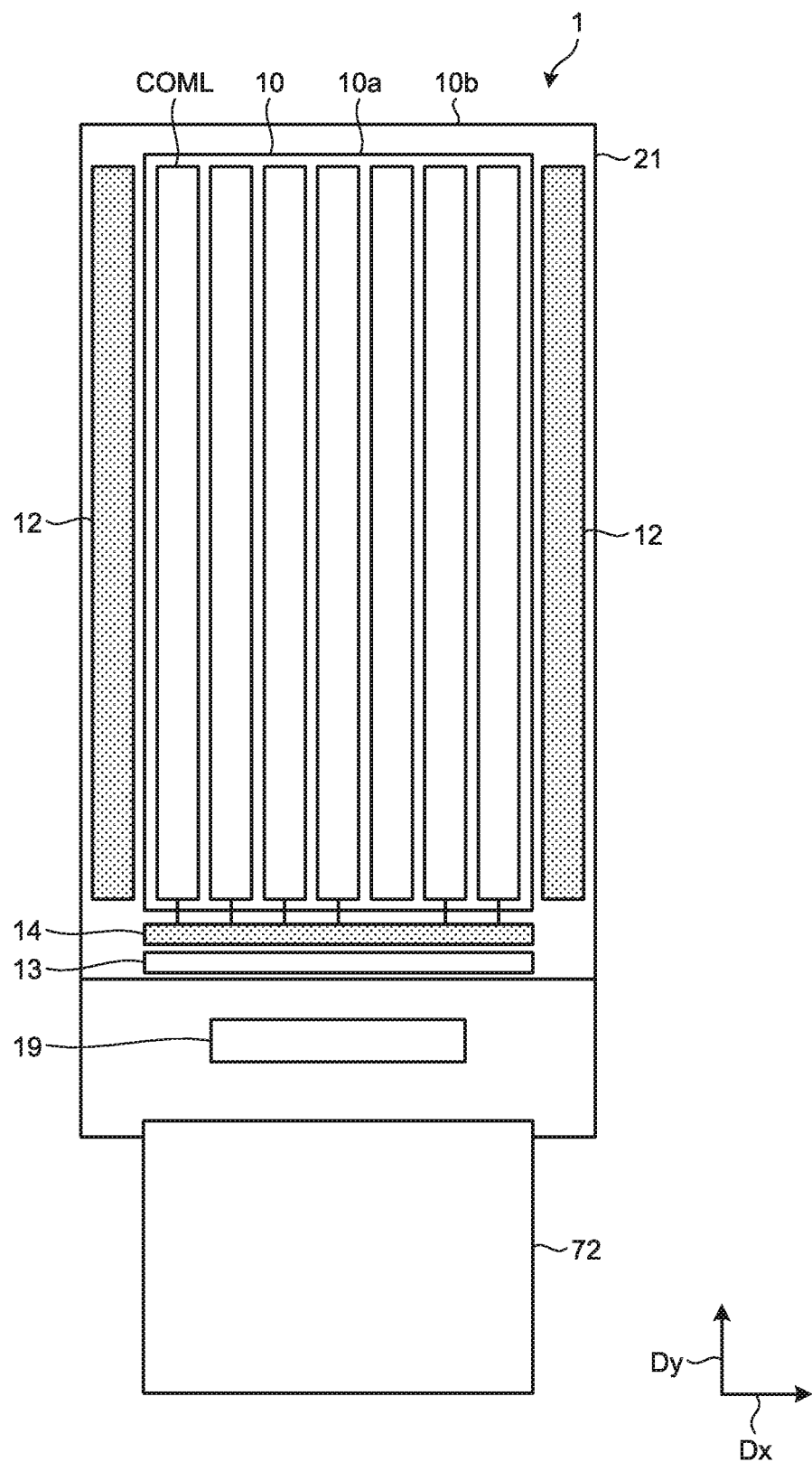
FIG. 9 is a plan view illustrating an example of a module having the touch-detection capable display device according to the first embodiment mounted thereon and illustrating an example of drive electrodes.
Figure 11:
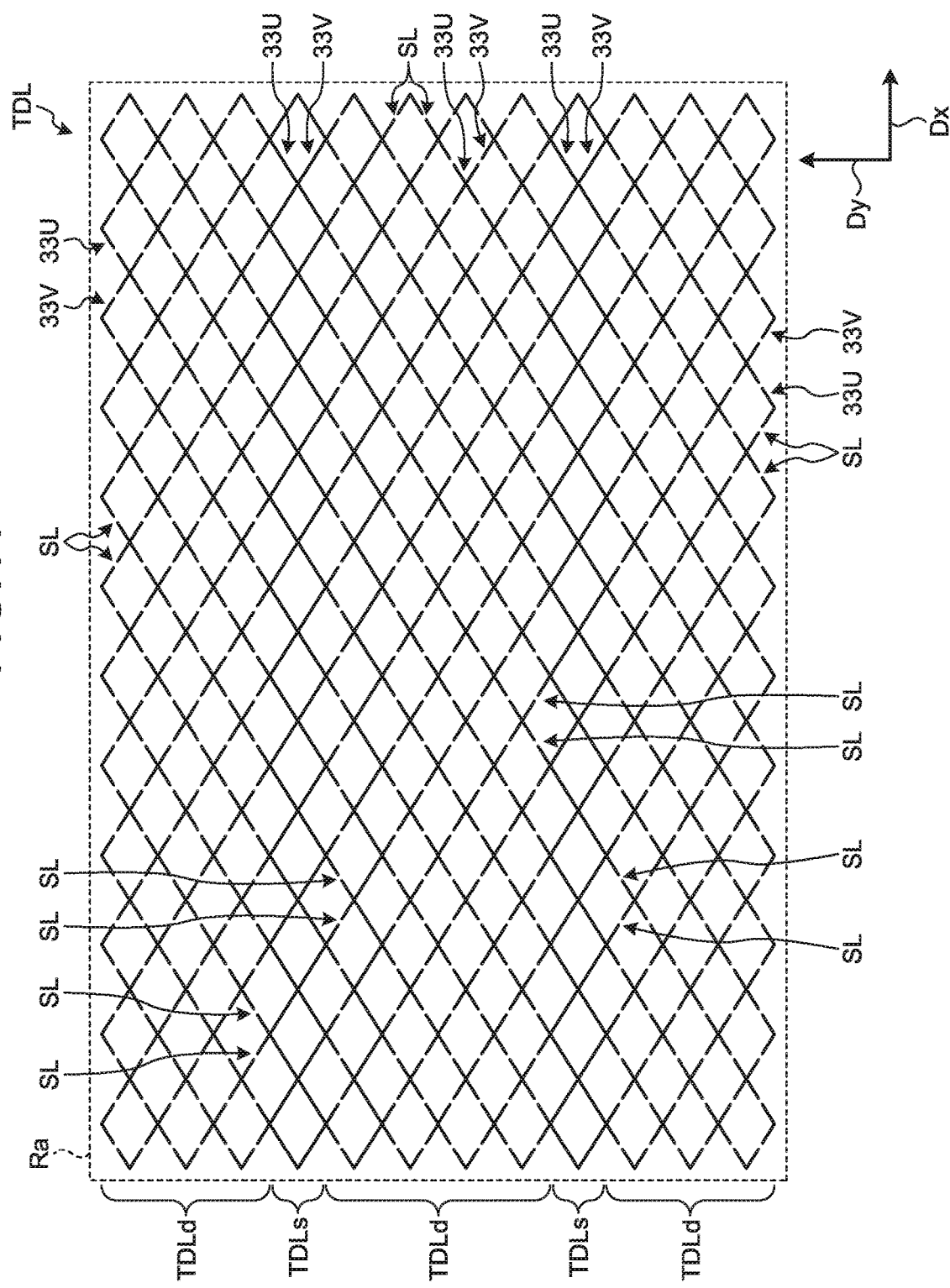
FIG. 11 is a plan view illustrating, in an enlarged manner, the region Ra illustrated in FIG. 10.

Next, the configurations of the drive electrode COML and the touch detection electrode TDL, and the touch detecting operation are described. FIG. 9 is a plan view illustrating an example of a module having the touch-detection capable display device according to the first embodiment mounted thereon and illustrating an example of drive electrodes. FIG. 10 is a plan view illustrating an example of a module having the touch-detection capable display device according to the first embodiment mounted thereon and illustrating an example of touch detection electrodes. FIG. 11 is a plan view illustrating, in an enlarged manner, the region Ra illustrated in FIG. 10.

As illustrated in FIG. 9, the first substrate 21 is sectioned into regions corresponding to: the display region 10a of the display panel 20 (see FIG. 1); and a peripheral region 10b provided to the outside of the display region 10a. The display IC 19 is mounted on the first substrate 21 in the peripheral region 10b. The display IC 19 is a component in which circuits of functions needed for the display operation are embedded, such as some of the functions of the controller 11, the gate driver 12, and the source driver 13 illustrated in FIG. 1. The peripheral region 10b may surround the display region 10a. In such a case, the peripheral region 10b can be referred to as a frame region instead.

The gate driver 12, the source driver 13, or the drive-electrode driver 14 is formed on the first substrate 21, which is a glass substrate. The display IC 19 and the drive-electrode driver 14 are provided in the peripheral region 10b. The display IC 19 may have the drive-electrode driver 14 embedded therein. In such a case, the peripheral region 10b can be narrowed. The flexible substrate 72 is coupled to the display IC 19, so that video signals Vdisp and a power-supply voltage are supplied to the display IC 19 from the outside via the flexible substrate 72.

As illustrated in FIG. 9, the drive electrodes COML are provided in a region of the first substrate 21, the region overlapping the display region 10a. The drive electrodes COML each extend in a direction (a second direction Dy) along the long edges of the display region 10a, and are arranged side by side with spaces between adjacent ones thereof in a direction (a first direction Dx) along the short edges of the display region 10a. Each of the drive electrodes COML is coupled to the drive-electrode driver 14.

In this embodiment, the drive electrodes COML extend in a direction intersecting the gate lines GCL. In other words, the drive electrodes COML extend in a direction parallel to the signal lines SGL. Consequently, in the peripheral region 10b, not only wires coupled to the drive electrodes COML but also the drive-electrode driver 14 can be positioned in a part different from a part in which the gate driver 12 is provided. Specifically, for example, as illustrated in FIG. 9, the gate driver 12 is provided in parts of the peripheral region 10b that extend along the respective long edges thereof, and the drive-electrode driver 14 and the source driver 13 are provided in a part of the peripheral region 10b, the part extending along one of the short edges thereof and having the flexible substrate 72 coupled thereto. The touch-detection capable display device 1 of this embodiment is therefore advantageous in narrowing parts of the peripheral region 10b that extend in a direction along the individual drive electrodes COML.

As illustrated in FIG. 10, the touch-detection capable display portion 10 has the touch detection electrodes TDL provided in a region of the second substrate 31, the region overlapping the display region 10a. Each of the touch detection electrodes TDL extends in a direction (the first direction Dx) intersecting a direction in which the individual drive electrodes COML illustrated in FIG. 9 extend. As illustrated in FIG. 10, these detection electrodes TDL are arranged side by side with spaces SP between adjacent ones thereof in the direction (the second direction Dy) in which the individual drive electrodes COML illustrated in FIG. 9 extend. That is, each of the drive electrodes COML and each of the detection electrodes TDL are disposed in a manner intersecting each other in a plan view, and a capacitance is generated in parts thereof overlapping each other.

During touch detecting operation, the touch-detection capable display device 1 sequentially applies the drive signals Vcom to the drive electrodes COML from the drive-electrode driver 14, thereby sequentially scanning detection lines one after another. That is, the touch-detection capable display portion 10 performs touch-detection scanning in parallel to the first direction Dx, which is parallel to one edge of the touch-detection capable display portion 10.

The touch detection electrodes TDL outputs touch detection signals Vdet1 to the touch detector 40. Touch detection for a single detection block is thus performed. That is, each of the drive electrodes COML and each of the touch detection electrodes TDL correspond to the drive electrode E1 and the touch detection electrode E2, respectively, in the above-described basic principle of touch detection according to the mutual capacitance method. The touch detection electrodes TDL and the drive electrodes COML form capacitive touch sensors in a matrix with each of the touch detection electrodes TDL and each of the drive electrodes COML intersecting each other. Thus, scanning the entirety of a touch detection surface of the touch panel 30 enables detection of a position touched or approached by a conductor from the outside.

In one exemplary manner of operation of the touch-detection capable display device 1, the touch-detection capable display device 1 time-divisionally performs the touch detecting operation (touch detection periods) and the display operation (display operation periods). Time may be divided between the touch detecting operation and the display operation in any desired manner.

In this embodiment, the drive electrodes COML each double as a common electrode of the display panel 20. Thus, during each display operation period, the controller 11 supplies the drive signal Vcomdc, which is a common electrode potential for display, to the drive electrode COML that has been selected via the drive-electrode driver 14.

The drive-electrode driver 14 may supply the drive signals Vcom for touch detection to the touch detection electrodes TDL when the detection operation is performed only with the touch detection electrodes TDL without the use of the drive electrodes COML during each touch detection period, that is, for example, when touch detection is performed based on the touch detection principle according to the self capacitance method.

As illustrated in FIG. 10 and FIG. 11, each of the touch detection electrodes TDL of this embodiment includes a plurality of first conductive thin wires 33U and a plurality of second conductive thin wires 33V. Each of the first conductive thin wires 33U and each of the second conductive thin wires 33V slope in opposite directions with respect to a direction parallel to one edge of the display region 10a. The first conductive thin wire 33U and the first direction Dx form a first angle, and the second conductive thin wire 33V and the first direction Dx form a second angle.

Each of the first conductive thin wires 33U and the second conductive thin wires 33V is a metal wire having a narrow width. In the display region 10a, the first conductive thin wires 33U are disposed side by side with spaces between adjacent ones thereof in a direction intersecting a direction in which the first conductive thin wires 33U extend, that is, in the second direction Dy. The second conductive thin wires 33V are also disposed side by side with spaces between adjacent ones thereof in the second direction Dy.

The touch detection electrode TDL includes at least one such first conductive thin wire 33U and at least one such second conductive thin wire 33V intersecting the first conductive thin wire 33U. The first conductive thin wire 33U and the second conductive thin wire 33V are electrically coupled to each other at a connection part 33X. When the two or more first conductive thin wires 33U intersect the two or more second conductive thin wires 33V, each opening of thus formed mesh of the touch detection electrode TDL forms a parallelogram.

The respective ends of the two or more first conductive thin wires 33U and the two or more second conductive thin wires 33V in a direction in which these thin wires extend are coupled to coupling wires 34a and 34b disposed in the peripheral region 10b. The first conductive thin wires 33U and the second conductive thin wires 33V, which serve as a main detector of the touch detection electrode TDL, are coupled to the coupling wires 34a and 34b through thin wires 33a. These first conductive thin wires 33U and these second conductive thin wires 33V are electrically coupled to one another, so that these first conductive thin wires 33U and second conductive thin wires 33V together function as one detection electrode TDL.

The first conductive thin wires 33U and the second conductive thin wires 33V are formed from a metal layer including at least one metal material selected from the group consisting of aluminum (Al), copper (Cu), silver (Ag), molybdenum (Mo), chrome (Cr), titanium (Ti), and tungsten (W). Otherwise, the first conductive thin wires 33U and the second conductive thin wires 33V are formed of an alloy containing at least one metal material selected from the group consisting of the above metal materials. Alternatively each of the first conductive thin wires 33U and the second conductive thin wires 33V may be a stack composed of a plurality of conductive layers that are made of the above metal materials or of the alloy containing at least one material selected from the group consisting of these materials. Optionally, a conductive layer formed of a light-transmissive conductive oxide such as ITO may be stacked on the first conductive thin wires 33U and the second conductive thin wires 33V. Alternatively, any one of a blackened film, a black organic film, and a black conductive organic film that can each be obtained by combining the at least one metal material described above and a conductive layer may be stacked thereon.

The metal materials described above have low resistance than the light-transmissive conductive oxide such as ITO. The above-described metal materials have higher light blocking tendency than the light-transmissive conductive oxide, thereby being likely to decrease the transmission or to make the pattern of the touch detection electrode TDL visible. In this embodiment, each one of the touch detection electrodes TDL includes a plurality of such first conductive thin wires 33U having narrow widths and a plurality of such second conductive thin wires 33V having narrow widths, and adjacent ones of the first conductive thin wires 33U and of the second conductive thin wires 33V are disposed with spaces therebetween that are each larger than the width of each of these wires. The first conductive thin wires 33U and the second conductive thin wires 33V are thereby allowed to have lower resistance than otherwise and to be invisible. This can result in lower resistance of the touch detection electrodes TDL and thus allows the touch-detection capable display device 1 to have a thinner profile, a larger screen, and a higher definition than otherwise. Depending on a combination of the at least one metal material described above and the first conductive layer 51, battery reaction or the like occurs, possibly resulting in corrosion of the metal material in the touch detection electrodes TDL. However, the corrosion is less likely to occur with the first conductive layer 51 having relatively high resistance.

The first conductive thin wires 33U and the second conductive thin wires 33V each preferably have a width within the range of 1 μm to 10 μm, and more preferably within the range of 1 μm to 5 μm. When the first conductive thin wires 33U and the second conductive thin wires 33V each have a width of 10 μm or less, the aperture ratio is less likely to be decreased thereby because the display region 10a has a smaller covered area within an aperture that is a region through which light transmission is not impeded by any of a black matrix, the gate lines GCL, and the signal lines SGL. When the width of each of the first conductive thin wires 33U and the second conductive thin wires 33V is 1 μm or more, breakage of the wire is less likely because the shape thereof is stabilized.

The following description refers to FIG. 8, FIG. 10, and FIG. 11. The touch detection electrode TDL has the first conductive thin wires 33U and the second conductive thin wires 33V pitched at certain distances, and, as a whole, extends in a direction intersecting a direction in which the color regions 32R, the color regions 32G, and the color regions 32B of the color filter 32 each extend. That is, the touch detection electrode TDL extends in the first direction Dx intersecting the signal lines SGL illustrated in FIG. 8. In order to keep the first conductive thin wires 33U and the second conductive thin wires 33V from blocking light that passes through any particular one of the color regions of the color filter 32, the first conductive thin wires 33U and the second conductive thin wires 33V form a net-like pattern formed of fractional thin wires among which some intersect and are coupled to the others while sloping in a direction opposite to a direction in which the others slope. Each of the first conductive thin wires 33U and each of the second conductive thin wires 33V slope in opposite directions at an angle θ with respect to a direction parallel to the direction (the second direction Dy) in which the color regions 32R, the color regions 32G, and the color regions 32B each extend. For example, the angle θ is within the range of 5 to 75 degrees, preferably within the range of 25 to 40 degrees, and more preferably within the range of 50 to 65 degrees.

Directions in which each of the first conductive thin wires 33U and each of the second conductive thin wires 33V of the touch detection electrode TDL extend thus form angles with respect to the direction in which the color regions 32R, the color regions 32G, and the color regions 32B of the color filter 32 each extend. As a result, the first conductive thin wires 33U and the second conductive thin wires 33V of the touch detection electrode TDL sequentially block light through the individual color regions 32R, the individual color regions 32G, and the individual color regions 32B of the color filter 32, so that the transmission can be prevented from being lower in any particular one of the color regions of the color filter 32. The first conductive thin wires 33U and the second conductive thin wires 33V of the touch detection electrode TDL may be arranged in an irregular fashion to a preferable extent. That is, in the touch detection electrode TDL, spaces between adjacent ones of the first conductive thin wires 33U may be varied, and spaces between adjacent ones of the second conductive thin wires 33V may also be varied.

As illustrated in FIG. 11, the touch detection electrode TDL includes sensor sections TDLs and dummy sections TDLd. The sensor sections TDLs and the dummy sections TDLd each extend in the first direction Dx, and are alternately disposed in the second direction Dy. The sensor sections TDLs are coupled to the coupling wires 34a and 34b illustrated in FIG. 10, and mainly function as detection electrodes. The dummy sections TDLd are provided in a manner electrically isolated from the sensor section TDLs and the coupling wires 34a and 34b. The dummy sections TDLd are dummy electrodes, which do not function as detection electrodes.

The sensor sections TDLs and the dummy sections TDLd each include the first conductive thin wires 33U and the second conductive thin wires 33V, and are formed in respective mesh-like structures similar to each other. The display region 10a provides favorable visibility because the light transmittance thereof is thus prevented from varying. The sensor sections TDLs are electrically isolated from the dummy sections TDLd with slits SL provided in the first conductive thin wires 33U and the second conductive thin wire 33V. Slits SL are provided in the first conductive thin wires 33U and in the second conductive thin wires 33V that form one mesh opening in the dummy sections TDLd. During touch detection, this configuration brings the dummy sections TDLd into a floating state in which voltage signals are not supplied.

The rate of covering with the touch detection electrodes TDL (the occupancy thereof per unit area) is preferably 10% or less. When the rate of covering is too high, the light transmission is so low that display appears dark or that the backlight consumes more power. The distance between each adjacent ones of the electrodes is preferably 300 μm or less. When the distance between each adjacent ones of the electrodes is larger than that, it is necessary to lower the resistance of the first conductive layer 51 so as to lower the resistance between the electrodes. Lowering the resistance of the first conductive layer 51 weakens touch signals.

As illustrated in FIG. 10, first wires 37a are coupled to the respective coupling wires 34a. Second wires 37b are coupled to the respective coupling wires 34b. That is, in this embodiment, the first wires 37a are coupled to the one end of the respective touch detection electrodes TDL, and the second wires 37b are coupled to the other end thereof. The first wires 37a are provided along one of the long edges of the peripheral region 10b. The second wires 37b are provided along the other long edge of the peripheral region 10b.

One of the first wires 37a and one of the second wires 37b that are coupled to the same touch detection electrode TDL are coupled to the same terminal section 36. That is, the touch detection electrode TDL, the first wire 37a, the second wire 37b, and the terminal section 36 are coupled to one another in a loop. The touch detection electrode TDL is coupled to the flexible substrate 71 via the first wire 37a, the second wire 37b, and the terminal section 36.

The first wires 37a and the second wires 37b are formed of a material that is the same as the at least one metal material, the alloy, or the like that the first conductive thin wires 33U and the second conductive thin wires 33V are formed of. Any material having favorable conductivity can be used for the first wires 37a and the second wires 37b, and a material different from that for the first conductive thin wires 33U and the second conductive thin wires 33V may be used therefor.

One of the first wires 37a and one of the second wires 37b are thus coupled to the same touch detection electrode TDL, so that, even when one of this first wire 37a and this second wire 37b is cut off, the other wire maintains the coupling between the touch detection electrode TDL and the flexible substrate 71. Therefore, the touch-detection capable display device 1 of this embodiment can have the touch detection electrode TDL and the flexible substrate 71 more reliably coupled to each other.

A configuration such that one of the first wires 37a or one of the second wire 37b only is coupled to each one of the touch detection electrodes TDL may be employed. Each of the touch detection electrodes TDL is not limited to being composed of metal thin wires formed in a mesh-like pattern, and may be formed of, for example, a plurality of metal thin wires formed in zigzag lines or in wavy lines. While FIG. 11 illustrates the sensor sections TDLs and the dummy sections TDLd included in one of the touch detection electrodes TDL, a dummy electrode may be disposed in the space SP between each adjacent ones of the touch detection electrodes TDL.

Figure 12:
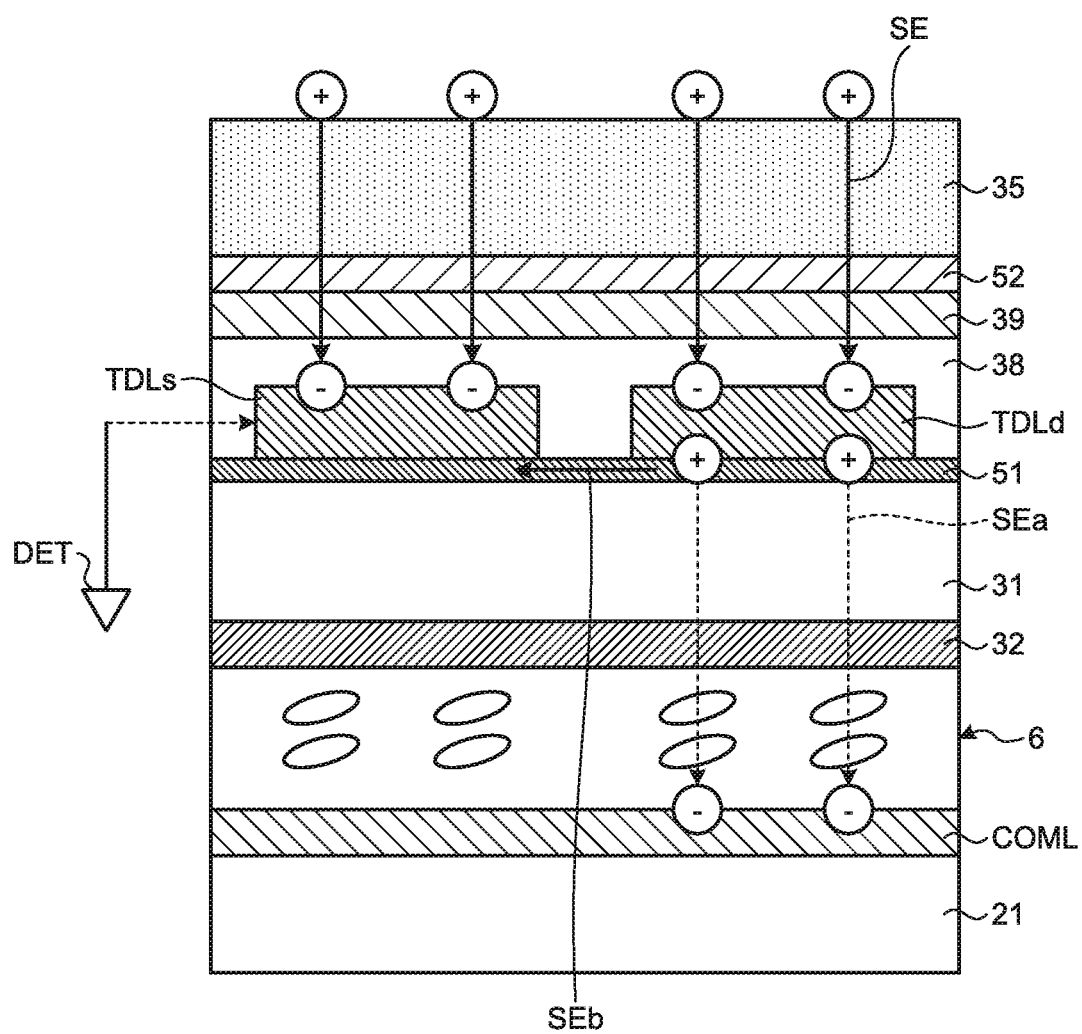
FIG. 12 is an explanatory diagram for schematically explaining flows of static electricity in the touch-detection capable display device.

Next, the first conductive layer 51 and the second conductive layer 52 are described. FIG. 12 is an explanatory diagram for schematically explaining flows of static electricity in the touch-detection capable display device. FIG. 12 illustrates an enlarged view of parts corresponding to the sensor section TDLs and the dummy section TDLd included in one of the touch detection electrodes TDL.

The first conductive layer 51 and the second conductive layer 52 are provided as a preventative measure against ESD that may occur during manufacture and use of the touch-detection capable display device 1. During the manufacture, the polarizing plate 35 is likely to be charged, for example, when a cover film is separated from the polarizing plate 35 or a cover substrate 101 (see FIG. 14) or when the cover substrate 101 is bonded. The polarizing plate 35 is likely to be charged also when a finger of a person touches the touch detection surface (a surface of the cover substrate 101) during inspection. During the use, the polarizing plate 35 is likely to be charged also when a charged finger of a user touches the touch detection surface.

If the first conductive layer 51 and the second conductive layer 52 are not provided, intrusion of electromagnetic noise such as static electricity from the outside makes it difficult to remove electric charges charged on the first conductive thin wires 33U and the second conductive thin wires 33V (see FIGS. 10 and 11) because the first conductive thin wires 33U and the second conductive thin wires 33V have low resistance and narrow widths. Such intrusion also makes it difficult to remove an electric charge charged on each of the dummy sections TDLd because the dummy section TDLd is in a floating state, that is, a state decoupled from the sensor sections TDLs, the first wires 37a, and the second wires 37b. Consequently, orientations in the liquid crystal layer 6 are changed by static electricity with which the polarizing plate 35 and/or the dummy sections TDLd are charged, and such change possibly degrades the display quality of the display panel 20. The touch detection signals Vdet1 are changed by such static electricity, and such change possibly reduces the touch detection accuracy of the touch panel 30.

In this embodiment, as illustrated in FIG. 12, the first conductive layer 51 is provided on the second substrate 31, and the sensor sections TDLs and the dummy sections TDLd of the touch detection electrodes TDL are provided on the first conductive layer 51. The second conductive layer 52 is provided under the polarizing plate 35. In other words, the first conductive layer 51 is provided between the second substrate 31 and the first conductive thin wires 33U and between the second substrate 31 and the second conductive thin wires 33V in a direction perpendicular to the second substrate 31. The second conductive layer 52 is provided between the polarizing plate 35 and the adhesive layer 39 above the first conductive thin wires 33U and the second conductive thin wires 33V.

The first conductive layer 51 overlaps the first conductive thin wires 33U and the second conductive thin wires 33V of the sensor sections TDLs and those of the dummy sections TDLd in direct contact therewith. The first conductive layer 51 is formed on almost the entire surface of the second substrate 31, and is seamlessly provided over the entire surface of the display region 10a and the peripheral region 10b (see FIG. 10). That is, the first conductive layer 51 has some parts overlapping the first conductive thin wires 33U and the second conductive thin wires 33V and the other parts not overlapping the first conductive thin wires 33U and the second conductive thin wires 33V. Adjacent ones of the first conductive thin wires 33U are coupled to each other, and adjacent ones of the second conductive thin wires 33V are coupled to each other, via the parts of the first conductive layer 51 that are not overlapping the first conductive thin wires 33U and the second conductive thin wires 33V. Namely, in the case that the first conductive layer 51 is continuously provided on the display region 10a and the peripheral region 10b, the first conductive layer 51 is not separately provided on the display region 10a and the peripheral region 10b. In addition, it can be said that the first conductive layer 51 is a single conductive layer which provided on on the display region 10a and the peripheral region 10b. The first conductive layer 51 is preferably provided in a position such that it overlaps the coupling wires 34a and 34b, the first wires 37a, and the second wires 37b, as illustrated in FIG. 10. The area of the first conductive layer 51 in a plan view is larger than the total of the areas of the first conductive thin wires 33U and the second conductive thin wires 33V.

The second conductive layer 52 is provided in direct contact with the polarizing plate 35. The second conductive layer 52 is provided on the entire surface of the display region 10a. More preferably, the second conductive layer 52 is seamlessly provided over the entire surface of the display region 10a and the peripheral region 10b (see FIG. 10). The first conductive layer 51 and the second conductive layer 52 are disposed so as to overlap each other in a plan view. The first conductive layer 51 and the second conductive layer 52 may have different shapes in a plan view. In such a case, at least a part of the first conductive layer 51 or of the second conductive layer 52 may be provided in a position such that the part does not overlap the second conductive layer 52 or the first conductive layer 51.

As illustrated in FIG. 12, upon application of static electricity SE to the surface of polarizing plate 35 from the outside, the static electricity SE is transmitted to the second conductive layer 52 through the polarizing plate 35. The static electricity SE that has reached the second conductive layer 52 is then transmitted to the sensor section TDLs and the dummy section TDLd through the adhesive layer 39 and the protective layer 38. Thus, the second conductive layer 52 is provided in direct contact with the polarizing plate 35, so that at least the polarizing plate 35 can be prevented from being charged.

As illustrated in FIG. 12, the first conductive layer 51 overlaps the first conductive thin wires 33U and the second conductive thin wires 33V of the sensor sections TDLs and those of the dummy sections TDLd in direct contact therewith, and is provided seamlessly between adjacent ones of the sensor sections TDLs and between adjacent ones of the dummy sections TDLd.

The above configuration causes static electricity SEb to flow from the dummy section TDLd to the first conductive layer 51 and then to the sensor section TDLs after the static electricity SE from the outside reaches the dummy section TDLd. To the sensor section TDLs, the static electricity SE from the outside and the static electricity SEb from the dummy section TDLd are transmitted. The static electricity SE and SEb transmitted to the sensor section TDLs flows to a power supply and the ground potential (GND) trough a resistive element included in the touch detector 40 and through an ESD-protection circuit (not illustrated), that is, is discharged. The first conductive layer 51 may be grounded to, for example, a housing of the touch-detection capable display device 1.

The first conductive layer 51 is preferably disposed on the second substrate 31 from end to end thereof. The first conductive layer 51 may further be electrically coupled to the power supply or GND through a conductive tape or the like from the peripheral region 10b.

As described above, with the first conductive layer 51 thus provided, the static electricity SE and SEb can be quickly removed from the sensor section TDLs and the dummy section TDLd even when the static electricity SE is applied to the first conductive thin wires 33U and the second conductive thin wires 33V of the sensor section TDLs and those of the dummy section TDLd. Consequently, the dummy section TDLd is prevented from being charged, and the static electricity SEa can be prevented from reaching the drive electrode COML from the dummy section TDLd through the liquid crystal layer 6. Thus, the touch-detection capable display device 1 of this embodiment can prevent the static electricity SE from degrading the display quality and reducing the touch detection accuracy. Therefore, the touch-detection capable display device 1 of this embodiment can be made more resistant to electromagnetic noise such as static electricity.

The first conductive layer 51 and the second conductive layer 52 each consisting primarily of the above-listed oxide material tend to prevent quality change and corrosion of the first conductive thin wires 33U and the second conductive thin wires 33V in the touch detection electrodes TDL. Assuming that the second conductive layer 52 is not provided, it is possible to adopt a configuration using an electrically conductive layer as the adhesive layer 39 to prevent the polarizing plate 35 from being charged. In such a case, an acid component and an ionic substance contained in the adhesive layer 39 are eluted, possibly causing quality change or corrosion of the first conductive thin wires 33U and the second conductive thin wires 33V. In this embodiment, the second conductive layer 52 is provided to allow the adhesive layer 39 to be made of a non-conductive material. That is, the adhesive layer 39 is made of a material containing neither any acid nor any ionic substance. Consequently, no ionic substance is eluted to the first conductive thin wires 33U and the second conductive thin wires 33V, and quality change and corrosion of the first conductive thin wires 33U and the second conductive thin wires 33V can be prevented.

As illustrated in FIG. 12, the voltage detector DET is coupled to the sensor section TDLs. In a case of the sensor section TDLs that is formed of, for example, aluminum, intrusion thereto of any ionic substance can be prevented if a fixed potential is set negative. Corrosion can be prevented by an appropriate combination of the material for the sensor section TDLs, elements of an ionic substance, and the like.

The first conductive layer 51 and the second conductive layer 52 have sheet resistances, for example, within the range of $10^8$ to $10^{14}$ ohms per square. More preferably, the first conductive layer 51 and the second conductive layer 52 have sheet resistances, for example, within the range of $10^9$ to $10^{13}$ ohms per square. The first conductive layer 51 and the second conductive layer 52 have sheet resistances lower than the resistance of the polarizing plate 35. The sheet resistances of the first conductive layer 51 and the second conductive layer 52 are higher than the sheet resistances of the first conductive thin wires 33U and of the second conductive thin wires 33V.

If the first conductive layer 51 and the second conductive layer 52 both have sheet resistances lower than $10^8$ ohms per square, the first conductive layer 51 and the second conductive layer 52 are likely to function as shields and deteriorate the touch detection performance. If the first conductive layer 51 and the second conductive layer 52 have sheet resistances higher than $10^{14}$ ohms per square, the static electricity SE and SEb is likely to be impeded from favorably flowing through the first conductive layer 51 and the second conductive layer 52. The second conductive layer 52 preferably has a sheet resistance less than or equal to the sheet resistance of the first conductive layer 51. This condition prevents the polarizing plate 35 from being charged with the static electricity SE, thereby enabling the static electricity SE to be quickly transmitted from the polarizing plate 35 to the sensor section TDLs and the dummy section TDLd.

Because the first conductive layer 51 and the second conductive layer 52 have lower sheet resistances than the resistance of the polarizing plate 35, the static electricity SE and SEb favorably flows through the first conductive layer 51 and the second conductive layer 52. Because the sheet resistances of the first conductive layer 51 and the second conductive layer 52 are higher than the sheet resistances of the first conductive thin wires 33U and the second conductive thin wires 33V, the first conductive layer 51 and the second conductive layer 52 do not function as shields and do not deteriorate the touch detection performance. More specifically, as long as the first conductive layer 51 and the second conductive layer 52 have sheet resistances set within the above described ranges, static electricity can be quickly removed because: the static electricity SE applied to the polarizing plate 35 flows to the second conductive layer 52; and, at the same time, the static electricity SE applied to the first conductive thin wires 33U and the second conductive thin wires 33V flows to the first conductive layer 51.

Furthermore, even when the first conductive layer 51 is provided seamlessly between adjacent ones of the first conductive thin wires 33U and between adjacent ones of the second conductive thin wires 33V, short-circuiting between the touch detection electrodes TDL (see FIG. 10) and between the sensor sections TDLs and the dummy sections TDLd can be prevented. The term "sheet resistance" herein means a value of resistance that a resistive element having a square shape in a plan view has between two opposite edges thereof. The sheet resistances of the first conductive layer 51 and the second conductive layer 52 can be measured by a well-known technique called four-terminal sensing using conductive layers deposited on, for example, the second substrate 31 by sputtering or the like.

As described above, the touch-detection capable display device 1 of this embodiment includes: the second substrate 31; the touch detection electrodes TDL including the first conductive thin wires 33U and the second conductive thin wires 33V (metal wires) and provided on a plane parallel to the second substrate 31; the first conductive layer 51 overlapping the first conductive thin wires 33U and the second conductive thin wires 33V in contact therewith and provided between the second substrate 31 and the first conductive thin wires 33U and between the second substrate 31 and the second conductive thin wires 33V in a direction perpendicular to the second substrate 31; and the second conductive layer 52 provided above the first conductive thin wires 33U and the second conductive thin wires 33V. The first conductive layer 51 and the second conductive layer 52 have higher sheet resistances than the first conductive thin wires 33U and the second conductive thin wires 33V.

Thus, the touch-detection capable display device 1 of this embodiment includes the second conductive layer 52, so that the static electricity SE is transmitted from the polarizing plate 35 to the sensor sections TDLs and the dummy sections TDLd through the second conductive layer 52. Consequently, at least the polarizing plate 35 can be prevented from being charged. Because the static electricity SEb flows through the first conductive layer 51, the static electricity SE that the sensor sections TDLs and the dummy sections TDLd is charged with can be quickly removed. As described above, the touch-detection capable display device 1 of this embodiment can prevent the static electricity SE from degrading the display quality and reducing the touch detection accuracy.

Manufacturing Method

Figure 13:
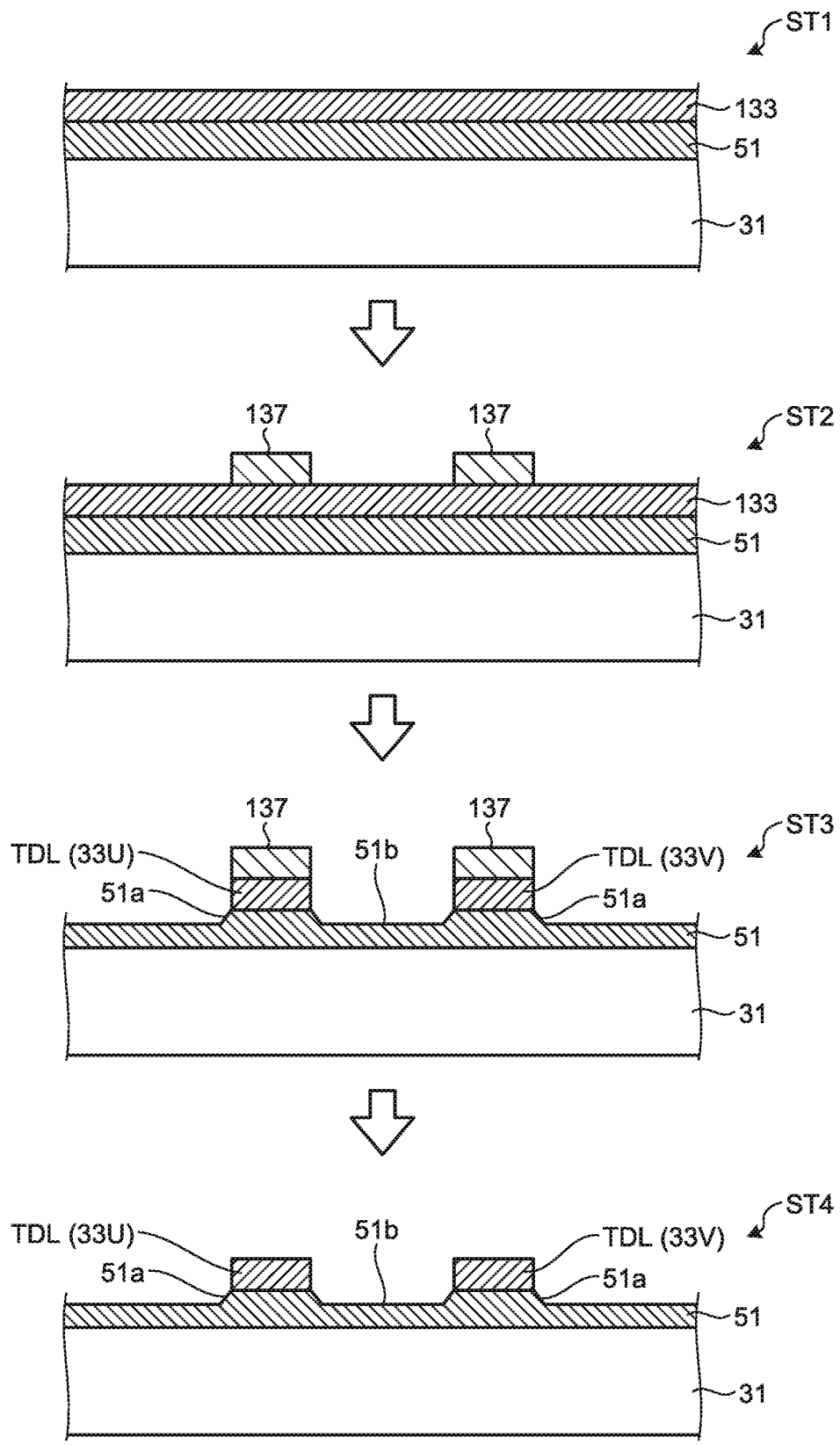
FIG. 13 is a process chart for explaining a method for manufacturing a first conductive layer and touch detection electrodes according to the first embodiment.

FIG. 13 is a process chart for explaining a method for manufacturing a conductive layer and touch detection electrodes according to the first embodiment. FIG. 13 is a sectional view of one of the first conductive thin wires 33U and one of the second conductive thin wires 33V in the touch detection electrode TDL.

As illustrated in FIG. 13, first of all, the first conductive layer 51 is formed of a material containing at least one of the above-listed oxides on the upper surface of the second substrate 31, and a metal layer 133 is formed on the first conductive layer 51 using the at least one metal material (Step ST1). The first conductive layer 51 and the metal layer 133 can be deposited as films in one continuous step by sputtering or the like.

A resist layer 137 is then formed on the metal layer 133 (Step ST2). The resist layer 137 is patterned by photolithography so as to be formed in positions overlapping patterns illustrated in FIG. 10 and FIG. 11 of the first conductive thin wires 33U and the second conductive thin wires 33V.

Thereafter, parts of the metal layer 133 that are not covered by the resist layer 137 are removed by etching (Step ST3). Parts of the metal layer 133 that overlap the resist layer 137 are not removed by etching, and are formed to the patterns of the first conductive thin wires 33U and the second conductive thin wires 33V. An etchant for the metal layer 133 needs to be changed depending on the at least one metal material. For example, a phosphoric acid based etchant can be used when the metal layer contains aluminum. In this embodiment, the first conductive layer 51 is formed of a light-transmissive conductive material containing any of the above-listed oxides, and contains a polycrystalline structure. For this reason, when this etchant is used for the metal layer 133, the first conductive layer 51 has a smaller etching rate (an amount of film removed per unit time during exposure to the etchant) than the metal layer 133. After parts of the metal layer 133 that do not overlap the resist layer 137 are removed, the first conductive layer 51 serves as an etching stopper and hampers the prepress of etching. At this step, parts of the first conductive layer 51 that do not overlap the resist layer 137 are slightly etched. The etching rate of the metal layer 133 is preferably at least one hundred times larger than that of the first conductive layer 51.

Subsequently, the resist layer 137 is removed, so that the patterns of the first conductive thin wires 33U and the second conductive thin wires 33V are formed on the first conductive layer 51 (Step ST4). While FIG. 13 illustrates one of the first conductive thin wires 33U and one of the second conductive thin wires 33V, the above-described steps are carried out on the entire surface of the second substrate 31 simultaneously. The two or more touch detection electrodes TDL including the first conductive thin wires 33U and the second conductive thin wires 33V are thus formed, as illustrated in FIG. 10.

The first conductive layer 51, the first conductive thin wires 33U, and the second conductive thin wires 33V are formed in the above-described steps. As illustrated in FIG. 13, the first conductive layer 51 consequently has: first portions 51a overlapping the first conductive thin wires 33U and the second conductive thin wires 33V; and second portions 51b not overlapping the first conductive thin wires 33U and the second conductive thin wires 33V. In this state, the first conductive layer 51 is thicker in the first portions 51a than in the second portions 51b. The first conductive layer 51 is formed of a material including a polycrystalline structure, and tends to be hardly etched by the etchant for the metal layer 133. For this reason, the first portions 51a of the first conductive layer 51 do not suffer side etching, and have widths substantially the same as or slightly larger than the widths of the first conductive thin wires 33U and the second conductive thin wires 33V. Thus, generation of a void can be prevented between a side surface of each of the first portions 51a and the protective layer 38 when the protective layer 38 (FIGS. 7 and 12) is applied on the first conductive layer 51, the first conductive thin wires 33U, and the second conductive thin wires 33V by printing or the like.

As illustrated in FIG. 13, the first conductive thin wires 33U and the second conductive thin wires 33V are formed on the first conductive layer 51, so that the first conductive layer 51 and the metal layer 133 are stacked in one continuous step by sputtering or the like (see Step ST1 in FIG. 13). Consequently, the number of sputtering steps does not increase for forming the first conductive layer 51, and the manufacturing cost can therefore be minimized.

Second Embodiment

Figure 14:
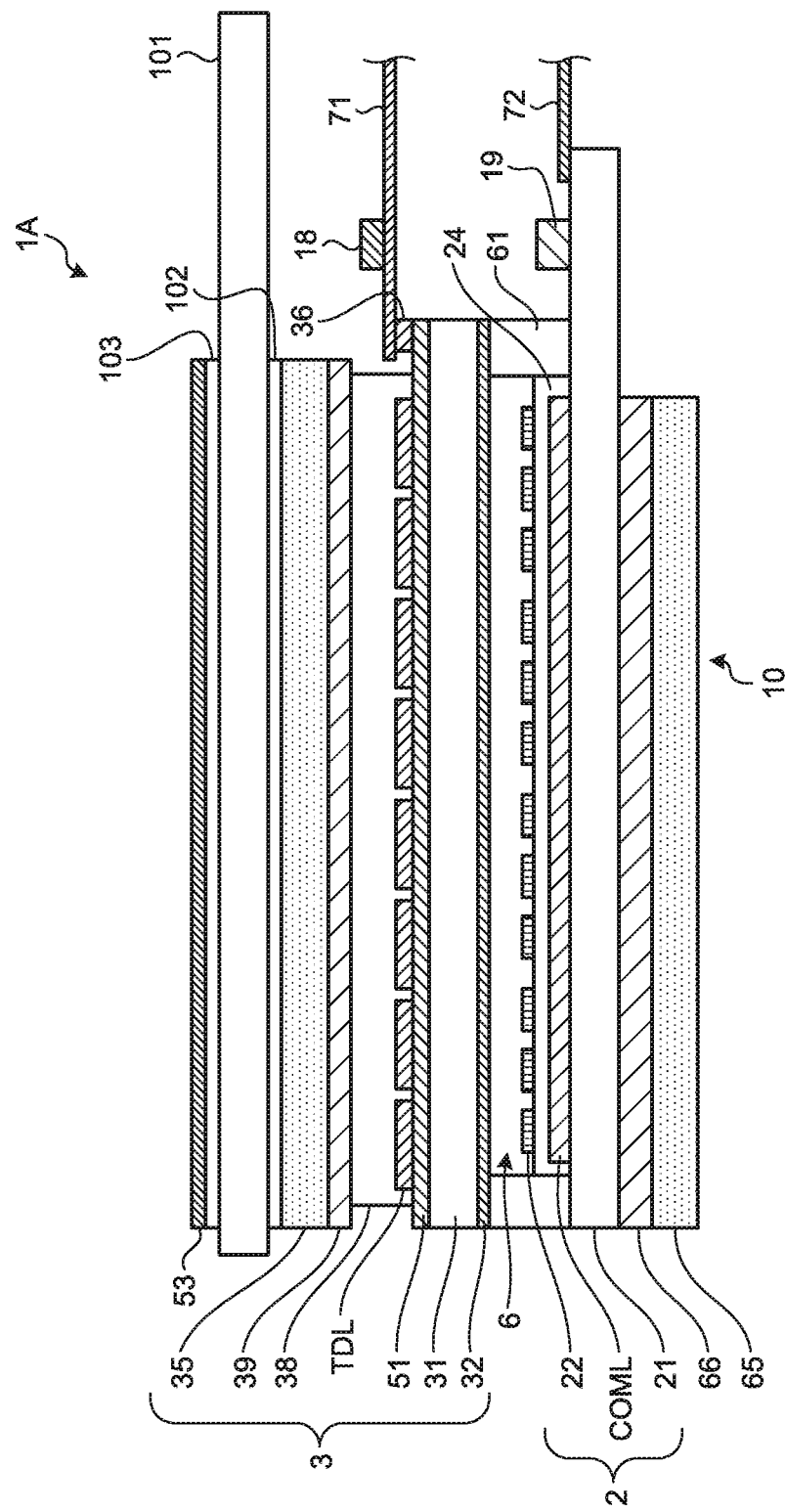
FIG. 14 is a sectional view representing a schematic sectional structure of a touch-detection capable display device according to a second embodiment.
Figure 15:
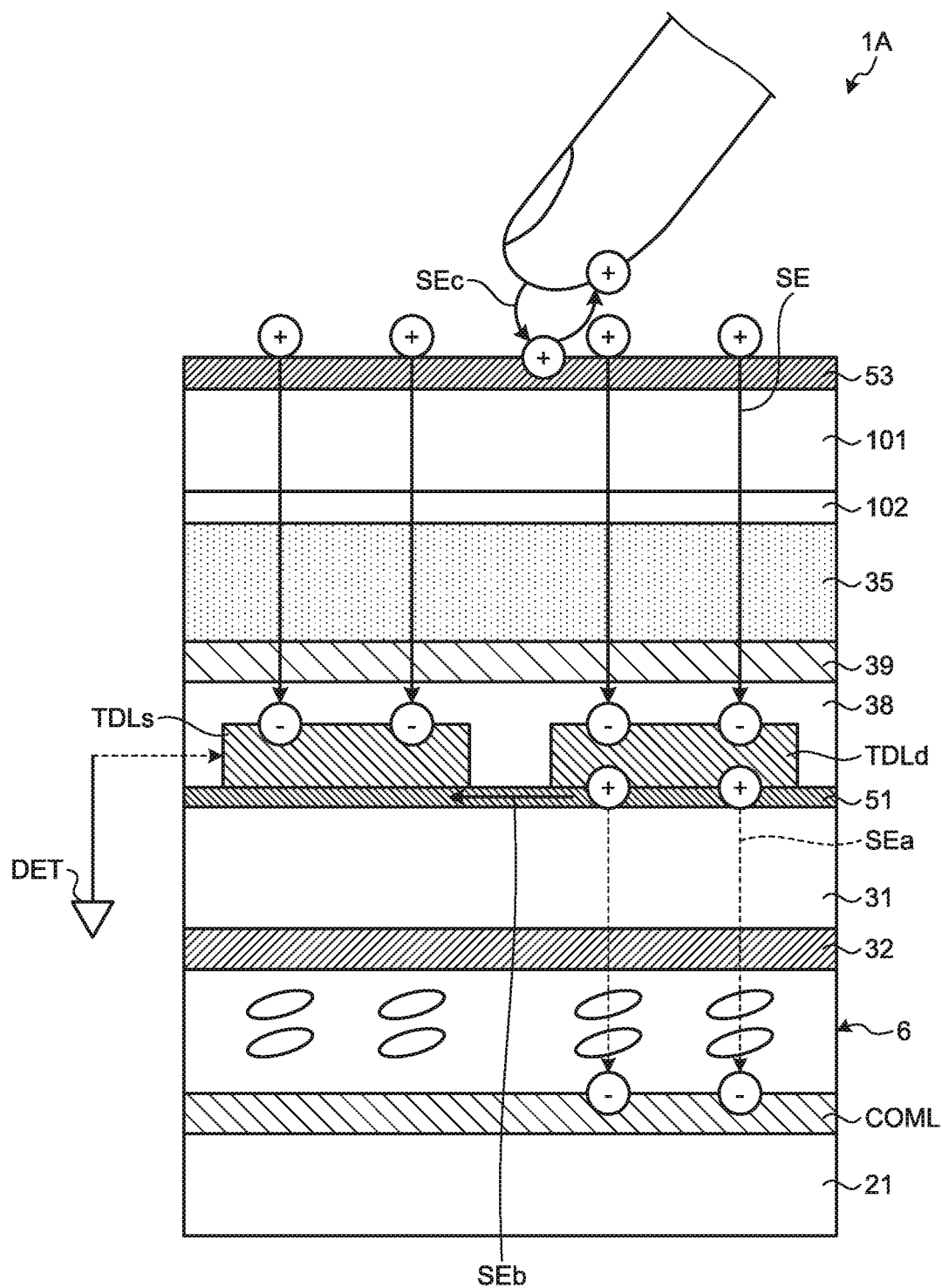
FIG. 15 is an explanatory diagram for schematically explaining the flow of static electricity in the touch-detection capable display device according to the second embodiment.

FIG. 14 is a sectional view representing a schematic sectional structure of a touch-detection capable display device according to a second embodiment. FIG. 15 is an explanatory diagram for schematically explaining the flow of static electricity in the touch-detection capable display device according to the second embodiment. The same constituent elements as those described above in the first embodiment are assigned the same reference signs, and redundant descriptions are omitted.

As illustrated in FIG. 14, a touch-detection capable display device 1A of this embodiment includes a cover substrate 101 above the polarizing plate 35 with an adhesive layer 102 interposed therebetween. A third conductive layer 53 is provided above the cover substrate 101 with a protective layer 103 interposed therebetween. The adhesive layer 39 is provided on the lower surface of the polarizing plate 35, and the polarizing plate 35 and the protective layer 38 are joined to each other with the adhesive layer 39 interposed therebetween. That is, in this embodiment, the second conductive layer 52 (see FIG. 7) is not provided under the polarizing plate 35. The drive electrodes COML, the touch detection electrodes TDL, and the first conductive layer 51 are configured in the same manner as those in the first embodiment.

The cover substrate 101 is provided covering the pixel substrate 2 and the counter substrate 3 to protect the pixel substrate 2 and the counter substrate 3. The cover substrate 101 is, for example, a glass substrate or a resin substrate. The outer contour of the cover substrate 101 is larger than those of the first substrate 21 and the second substrate 31 in a plan view.

The third conductive layer 53 is provided as a preventative measure against ESD, and is formed of the same material as the above-described first conductive layer 51. The third conductive layer 53 is, for example, a light-transmissive conductive layer containing an oxide such as tin dioxide ($SnO_2$). The third conductive layer 53 is provided above the upper surface of the cover substrate 101 that serves as a touch detection surface. In touch detection, an object to be detected, such as a finger, touches or approaches the surface of the third conductive layer 53. The third conductive layer 53 is provided at least on the entire surface of the display region 10a (see FIG. 10 for example). The third conductive layer 53 is preferably provided over the entire surface of the display region 10a and the entire surface of the peripheral region 10b (see FIG. 10 for example).

The protective layer 103 is, for example, a contamination-proof film. The protective layer 103 has, for example, a fingerprint-proof capability that allows no fingerprint to be left on the touch detection surface when a finger or the like touches it. The protective layer 103 in some cases may have minute irregularities on its surface, which are likely to facilitate charging of the protective layer 103. The third conductive layer 53 may be provided directly on the cover substrate 101 without the protective layer 103 provided on the cover substrate 101.

As illustrated in FIG. 15, when static electricity SE is applied to a surface of the cover substrate 101 from the outside, the static electricity SE is transmitted to the sensor section TDLs and the dummy section TDLd through the third conductive layer 53, the cover substrate 101, the adhesive layer 102, the polarizing plate 35, the adhesive layer 39, and the protective layer 38. Static electricity SEb flows from the dummy section TDLd to the first conductive layer 51 and then reaches the sensor section TDLs. The static electricity SE and SEb that has reached the sensor section TDLs flows to a power supply and the GND through a resistive element included in the touch detector 40 and through an ESD-protection circuit (not illustrated).

In this embodiment, the third conductive layer 53 is provided on or above the cover substrate 101. When a finger is touching or has approached the touch detection surface (a surface of the cover substrate 101), this configuration causes static electricity SEc from the finger to flow through the third conductive layer 53 and then return to the finger. Thus, the static electricity SEc from the finger can be prevented from reaching the touch detection electrodes TDL. Provision of the third conductive layer 53 not only can prevent the static electricity SEc from the finger from reaching the interior of the touch-detection capable display device 1A but also can, for example, exclude the possibility that static electricity is generated as a result of removal of a protective film from the cover substrate 101 and reaches the interior thereof.

The third conductive layer 53 has a sheet resistance, for example, within the range of $10^8$ to $10^{14}$ ohms per square. More preferably, the third conductive layer 53 has a sheet resistance, for example, within the range of $10^9$ to $10^{13}$ ohms per square. The sheet resistance of the third conductive layer 53 is higher than the sheet resistances of the first conductive thin wires 33U and of the second conductive thin wires 33V. If the third conductive layer 53 has a sheet resistance lower than $10^8$ ohms per square, the third conductive layer 53 is likely to function as a shield and deteriorate the touch detection performance. If the third conductive layer 53 has a sheet resistance higher than $10^{14}$ ohms per square, static electricity SEc from a finger is likely to be impeded from favorably flowing through the third conductive layer 53.

With the first conductive layer 51 and the third conductive layer 53 thus provided, not only the static electricity SEc from the finger can be prevented from reaching the polarizing plate 35, but also the static electricity SE applied to the sensor section TDLs and the dummy section TDLd can be quickly removed. Consequently, static electricity SEa from the dummy section TDLd can be prevented from reaching the drive electrodes COML. Thus, the touch-detection capable display device 1A of this embodiment can prevent the static electricity SE from degrading the display quality and reducing the touch detection accuracy.

Third Embodiment

Figure 16:
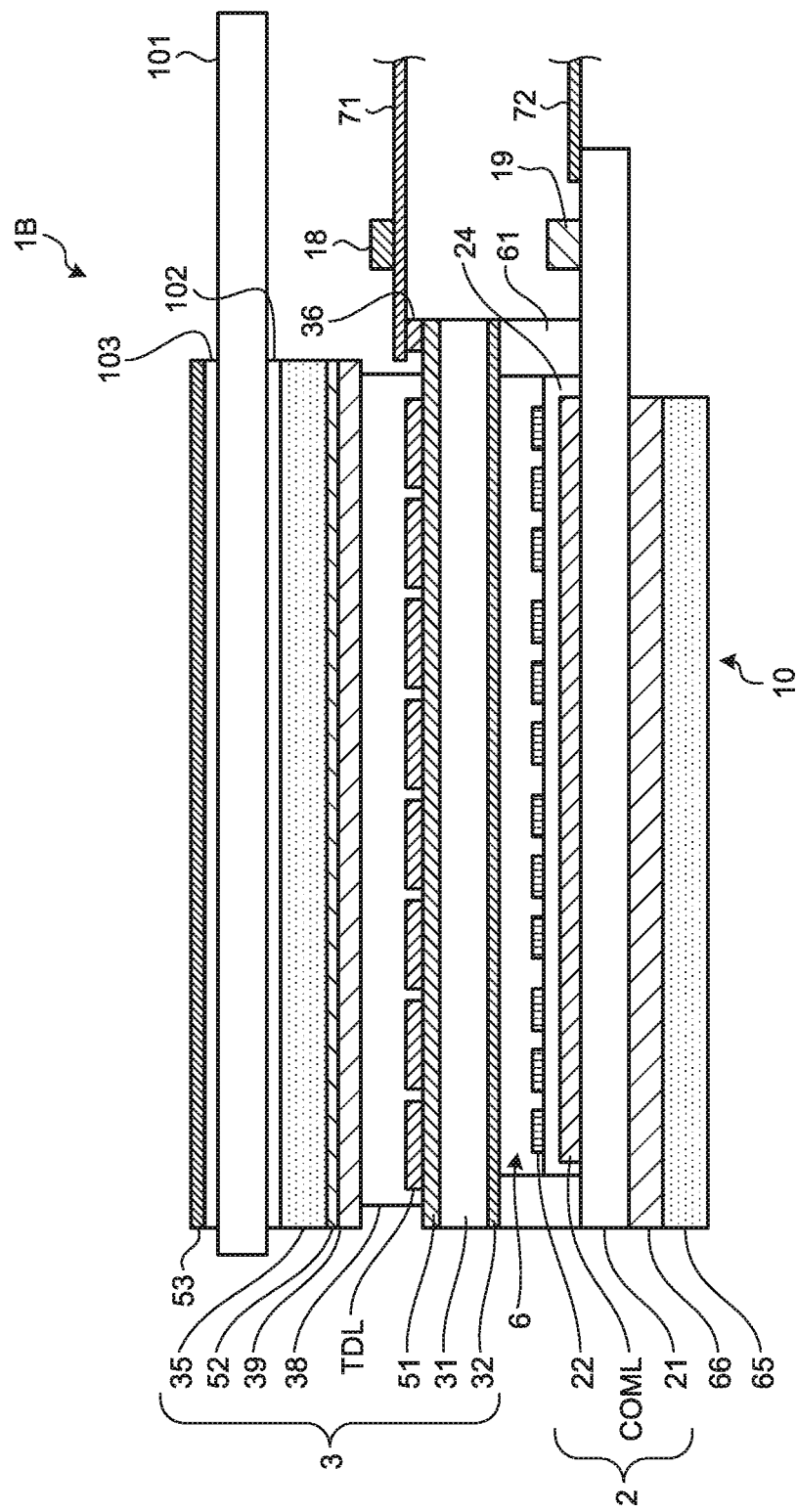
FIG. 16 is a sectional view representing a schematic sectional structure of a touch-detection capable display device according to a third embodiment.
Figure 17:
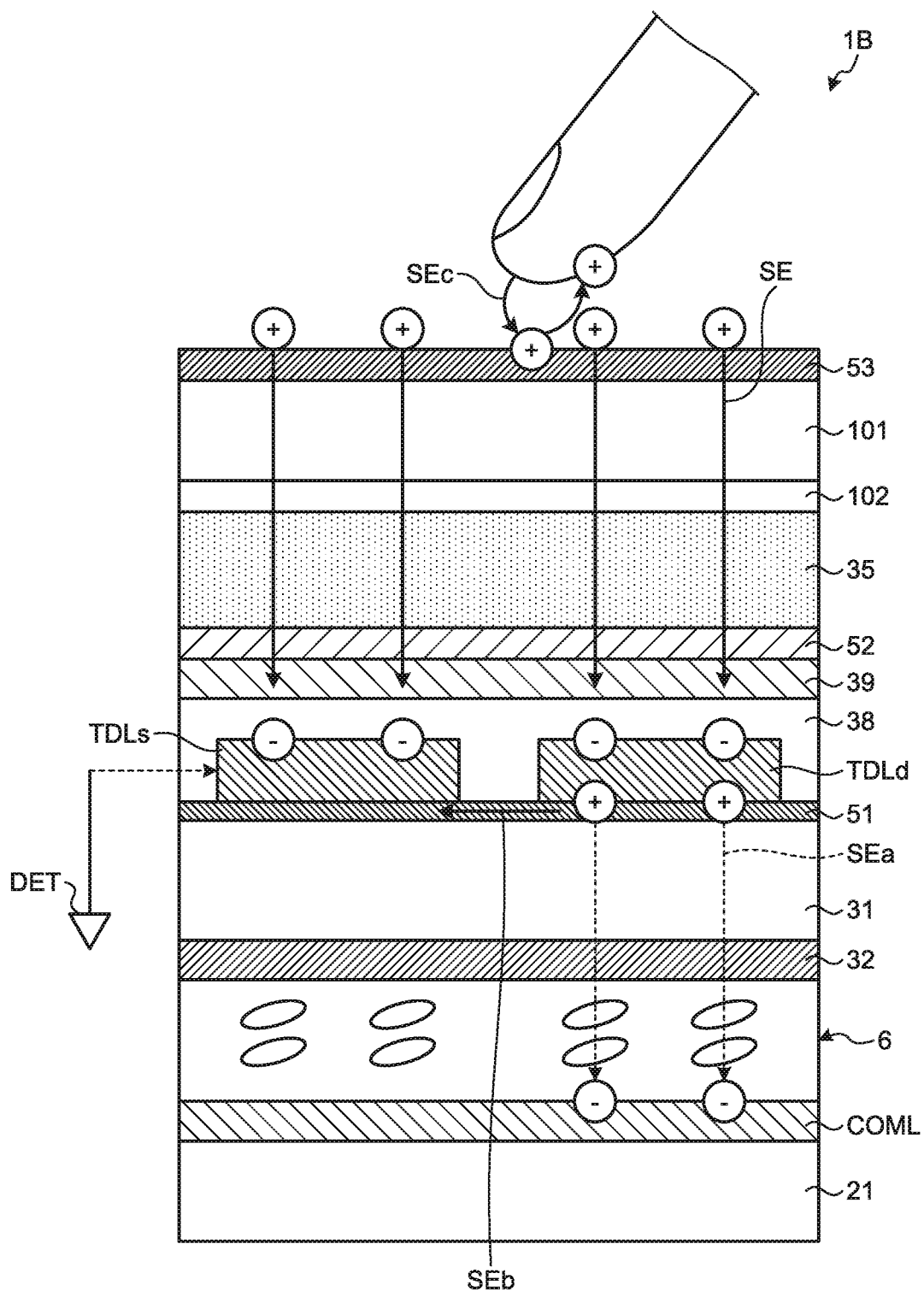
FIG. 17 is an explanatory diagram for schematically explaining the flow of static electricity in the touch-detection capable display device according to the third embodiment.

FIG. 16 is a sectional view representing a schematic sectional structure of a touch-detection capable display device according to a third embodiment. FIG. 17 is an explanatory diagram for schematically explaining the flow of static electricity in the touch-detection capable display device according to the third embodiment. The same constituent elements as those described above in the first embodiment and the second embodiment are assigned the same reference signs, and redundant descriptions are omitted.

A touch-detection capable display device 1B of this embodiment includes the first conductive layer 51, the second conductive layer 52, and the third conductive layer 53. The first conductive layer 51 is, as in the first embodiment, provided between the second substrate 31 and the touch detection electrodes TDL in a direction perpendicular to a surface of the second substrate 31. The second conductive layer 52 is, as in the first embodiment, provided above the touch detection electrodes TDL and between the adhesive layer 39 and the polarizing plate 35. The cover substrate 101 is provided above the polarizing plate 35, and the third conductive layer 53 is provided on or above the cover substrate 101. That is, the third conductive layer 53 is provided above the first conductive layer 51 and the second conductive layer 52.

The third conductive layer 53 is provided as a preventative measure against ESD, and is formed of the same material as the above-described first conductive layer 51. The third conductive layer 53 is, for example, a light-transmissive conductive layer containing an oxide such as tin dioxide ($SnO_2$). The third conductive layer 53 is provided above the upper surface of the cover substrate 101 that serves as a touch detection surface. In touch detection, an object to be detected, such as a finger, touches or approaches the surface of the third conductive layer 53. The third conductive layer 53 is provided at least on the entire surface of the display region 10a (see FIG. 10 for example). The third conductive layer 53 is preferably provided over the entire surface of the display region 10a and the entire surface of the peripheral region 10b (see FIG. 10 for example).

The first conductive layer 51, the second conductive layer 52, and the third conductive layer 53 are provided so as to overlap one another in a plan view. Each of the first conductive layer 51, the second conductive layer 52, and the third conductive layer 53 is preferably provided on the entire surface of the display region 10a and the entire surface of the peripheral region 10b (see FIG. 10 for example). This is not a limiting example, and another configuration such that at least one of the first conductive layer 51, the second conductive layer 52, and the third conductive layer 53 is not provided in the peripheral region 10b may be employed. The outer contours of the first conductive layer 51, the second conductive layer 52, and the third conductive layer 53 may be different in a plan view.

As illustrated in FIG. 17, in the touch-detection capable display device 1B of this embodiment, the third conductive layer 53 is provided on the cover substrate 101. When a finger is touching or has approached the touch detection surface (a surface of the cover substrate 101), this configuration causes static electricity SEc from the finger to flow through the third conductive layer 53 and then return to the finger.

The second conductive layer 52 is provided in direct contact with the polarizing plate 35. Consequently, static electricity SE that has reached the polarizing plate 35 via the cover substrate 101 reaches the second conductive layer 52 through the polarizing plate 35. Consequently, at least the polarizing plate 35 can be prevented from being charged, and degradation in display quality and reduction in touch detection accuracy due to static electricity from the polarizing plate 35 can be prevented. The static electricity SE then reaches the sensor section TDLs and the dummy section TDLd through the second conductive layer 52.

The first conductive layer 51 overlaps the first conductive thin wires 33U and the second conductive thin wires 33V in direct contact therewith, and is provided seamlessly between adjacent ones of the sensor sections TDLs and between adjacent ones of the dummy sections TDLd. Static electricity SEb flows from the dummy section TDLd to the first conductive layer 51 and then reaches the sensor section TDLs. The static electricity SE and SEb that has reached the dummy section TDLd flows to a power supply and the GND through a resistive element included in the touch detector 40 and through an ESD-protection circuit (not illustrated). As described above, the static electricity SE applied to the sensor sections TDLs and the dummy sections TDLd can be quickly removed. Consequently, static electricity SEa from the dummy section TDLd can be prevented from being transmitted to the drive electrodes COML through the liquid crystal layer 6.

As described herein, the configuration according to this embodiment includes the first conductive layer 51, the second conductive layer 52, and the third conductive layer 53, thereby being capable of preventing the internal members of the touch-detection capable display device 1B from being charged with static electricity applied from the outside such as a finger. Thus, the touch-detection capable display device 1 of this embodiment can prevent the static electricity SE from degrading the display quality and reducing the touch detection accuracy. Therefore, the touch-detection capable display device 1 of this embodiment can be made more resistant to electromagnetic noise such as static electricity.

Fourth Embodiment

Figure 18:
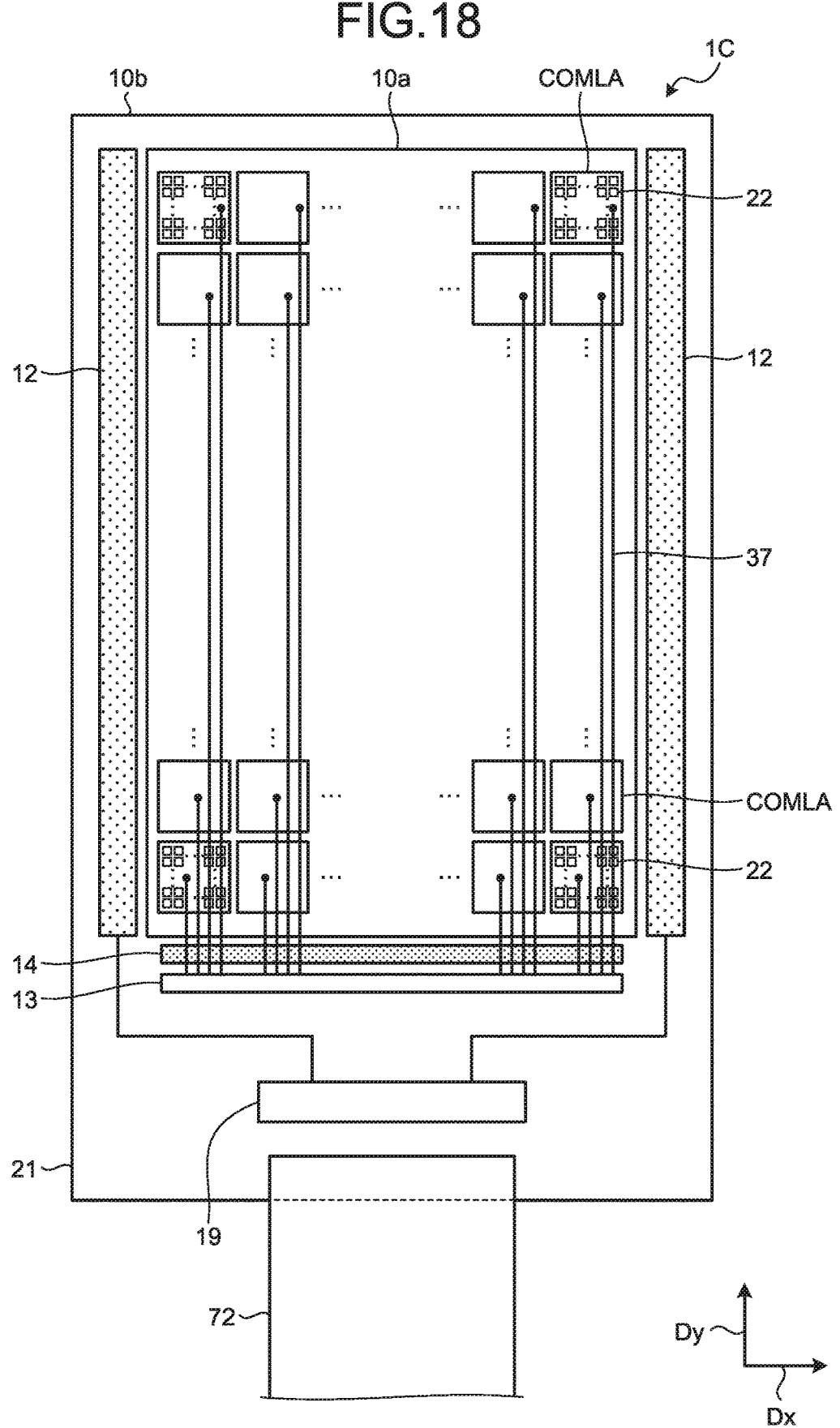
FIG. 18 is a plan view illustrating an example of a drive electrode in a touch-detection capable display device according to a fourth embodiment.
Figure 19:
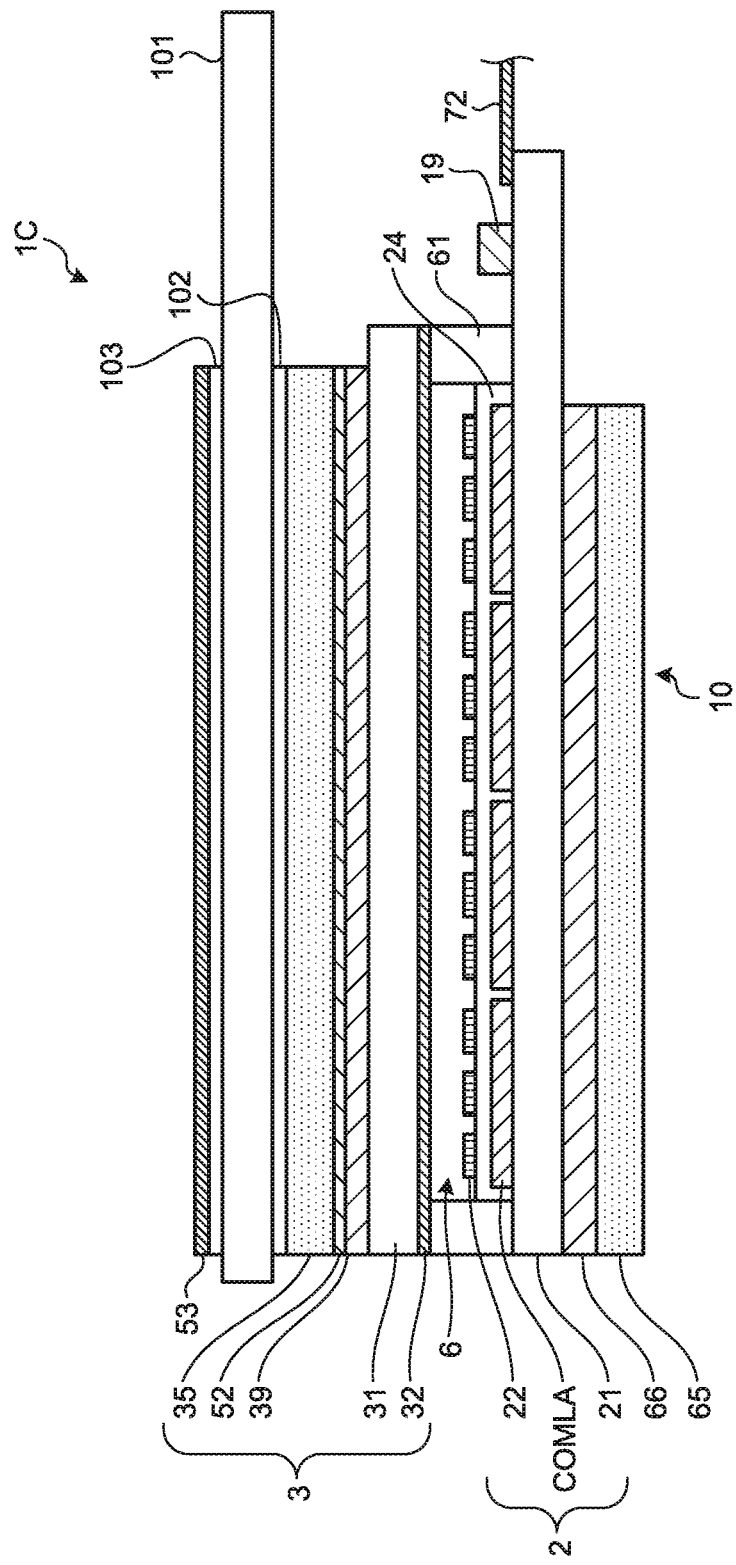
FIG. 19 is a sectional view representing a schematic sectional structure of the touch-detection capable display device according to the fourth embodiment.

FIG. 18 is a plan view illustrating an example of a drive electrode in a touch-detection capable display device according to a fourth embodiment. FIG. 19 is a sectional view representing a schematic sectional structure of the touch-detection capable display device according to the fourth embodiment. The same constituent elements as those described above in the first to the third embodiments are assigned the same reference signs, and redundant descriptions are omitted.

As illustrated in FIG. 18, a touch-detection capable display device 1C of this embodiment includes a plurality of drive electrodes COMLA disposed in a matrix having a row-column configuration on the first substrate 21 in the display region 10*a*. In other words, two or more of the drive electrodes COMLA are arranged in each line in the first direction Dx, and two or more of the drive electrodes COMLA are arranged in each line in the second direction Dy. Two or more of the pixel electrodes 22 are arranged overlapping each one of the drive electrodes COMLA. While FIG. 18 illustrates some of the drive electrodes COMLA and some of the pixel electrodes 22, the drive electrodes COMLA and the pixel electrodes 22 are disposed in a matrix having a row-column configuration on a plane corresponding to the entire display region 10*a*.

The respective drive electrodes COMLA are coupled to the drive-electrode driver 14 via wires 37. During display operation, the drive-electrode driver 14 supplies drive signals Vcomdc for display to all of the drive electrodes COMLA. During touch detection, the drive-electrode driver 14 supplies drive signals Vcom to the drive electrodes COMLA concurrently or sequentially. The drive electrodes COMLA output touch detection signals Vdet2 to the touch detector 40, the touch detection signals Vdet2 corresponding to changes in capacitance of the respective drive electrodes COMLA. Touch detection is performed on the touch detection surface based on the touch detection signals Vdet2 output from the respective drive electrodes COMLA. The drive electrodes COMLA functions as a common electrode during display operation, and also functions as detection electrodes during touch detection based on the self-capacitance method.

While layers in which the wires 37 are provided and in which the drive electrodes COMLA are provided are different and have an insulating layer (not illustrated) interposed therebetween, the wires 37 overlap the drive electrodes COMLA in a plan view. This is not the limiting example, and the wires 37 and the drive electrodes COMLA may be provided in the same layer. In such a case, each of the wires 37 runs through a gap between adjacent ones of the drive electrodes COMLA and is coupled to the drive-electrode driver 14.

As illustrated in FIG. 19, the polarizing plate 35 is provided above the second substrate 31 with the adhesive layer 39 and the second conductive layer 52 interposed therebetween. In other words, the second conductive layer 52 is provided between the adhesive layer 39 and the polarizing plate 35 in a direction perpendicular to a surface of the second substrate 31. The cover substrate 101 is provided above the polarizing plate 35 with the adhesive layer 102 interposed therebetween. The third conductive layer 53 is provided above the cover substrate 101 with the protective layer 103 interposed therebetween. In this embodiment, the drive electrodes COMLA double as detection electrodes, and thus the touch detection electrodes TDL and the first conductive layer 51 are not provided on the second substrate 31.

In the touch-detection capable display device 1C of this embodiment, the third conductive layer 53 is provided on or above the cover substrate 101. When a finger is touching or has approached the touch detection surface (a surface of the cover substrate 101), this configuration causes static electricity SEc from the finger to flow through the third conductive layer 53 and then return to the finger in the same manner as the static electricity SEc illustrated in FIG. 17 flows.

The second conductive layer 52 is provided in direct contact with the polarizing plate 35. This configuration causes static electricity SE applied from the outside to flow to the second conductive layer 52 through the polarizing plate 35. The second conductive layer 52 is grounded to, for example, a housing of the touch-detection capable display device 1C. This configuration can prevent the polarizing plate 35 from being charged.

While preferred embodiments of the present disclosure have been described heretofore, these embodiments are not intended to limit the present disclosure. Descriptions disclosed in these embodiments are merely illustrative, and can be changed variously without departing from the spirit of the present disclosure. Changes made without departing from the spirit of the present disclosure naturally fall within the technical scope of the present disclosure.

The display device according to embodiments of the present invention can have the following aspects.
(1) A touch detecting device comprising:
    a substrate;
    a touch detection electrode provided on a plane parallel to the substrate and including a plurality of metal wires;
    a first conductive layer overlapping the metal wires in contact therewith and provided between the substrate and the metal wires in a direction perpendicular to the substrate; and
    a second conductive layer provided above the metal wires, wherein
    at least one of the first conductive layer and the second conductive layer has a higher sheet resistance than the metal wires.

(2) The touch detecting device according to (1), wherein the second conductive layer has a sheet resistance less than or equal to the sheet resistance of the first conductive layer.
(3) The touch detecting device according to (1), wherein each of the first conductive layer and the second conductive layer is a light-transmissive conductive layer.
(4) The touch detecting device according to (1), wherein each of the first conductive layer and the second conductive layer contains tin oxide or indium oxide.
(5) The touch detecting device according to (1), further comprising:
a protective layer provided above the metal wires and the first conductive layer;
a polarizing plate provided above the protective layer; and
an insulating layer provided between the polarizing plate and the protective layer, wherein
the second conductive layer is provided between the insulating layer and the polarizing plate.
(6) The touch detecting device according to (5), further comprising:
a cover substrate provided above the polarizing plate; and
a third conductive layer provided above the cover substrate.
(7) The touch detecting device according to (1), further comprising:
a protective layer provided above the metal wires and the first conductive layer;
a polarizing plate provided above the protective layer;
an insulating layer provided between the polarizing plate and the protective layer; and
a cover substrate provided above the polarizing plate, wherein
the second conductive layer is provided above the cover substrate.
(8) The touch detecting device according to (1), wherein
the touch detection electrode includes a sensor section and a dummy section, the dummy section being provided in a manner isolated from the sensor section, and
the first conductive layer is seamlessly provided and overlaps the sensor section and the dummy section.
(9) The touch detecting device according to (1), wherein the metal wires include at least one first thin wire and at least one second thin wire in a manner coupled with each other, the first thin wire forming a first angle with respect to a first direction, the second thin wire forming a second angle with respect to the first direction.
(10) The touch detecting device according to (1), wherein
the metal wires are obtained by patterning a metal layer, and
the first conductive layer and the metal layer are stacked continuously.
(11) The touch detecting device according to (10), wherein
the patterning of the metal layer includes etching, and
an etching rate for the first conductive layer is lower than an etching rate for the metal layer.
(12) The touch detecting device according to (1), wherein the first conductive layer is provided on an entire surface of a display region.
(13) A touch-detection capable display device comprising:
a touch detecting device according to claim 1;
a plurality of pixel electrodes provided on a plane parallel to the substrate and arranged opposing the touch detection electrode and in a matrix; and
a display function layer configured to be driven by an image signal.
(14) The touch-detection capable display device according to (13), further comprising:
a drive electrode provided on a plane parallel to the substrate, the drive electrode being configured to generate a capacitance between the drive electrode and the touch detection electrode.
(15) The touch-detection capable display device according to (13), further comprising:
a drive electrode provided on a plane parallel to the substrate, the drive electrode being configured to generate a transverse electric field between the drive electrode and the pixel electrodes, wherein
the display function layer is driven by the transverse electric field.

What is claimed is:
1. A touch detecting device comprising:
a substrate;
a touch detection electrode provided on a plane parallel to the substrate and including a plurality of metal wires;
a plurality of conductive layers including
a first conductive layer that overlaps the metal wires and that is in direct contact with the metal wires, the first conductive layer having a first sheet resistance, and
a second conductive layer provided above the metal wires, the second conductive layer having a second sheet resistance;
a protective layer;
a polarizing plate; and
an insulating layer,
wherein
(a) the first conductive layer having the first sheet resistance that is less than a sheet resistance of the polarizing plate and that is no less than the second sheet resistance, (b) the metal wires having a third sheet resistance that is less than each of the first sheet resistance and the second sheet resistance, (c) the protective layer, (d) the insulating layer, (e) the second conductive layer having the second sheet resistance that is less than the sheet resistance of the polarizing plate and that is no more than the first sheet resistance, the second conductive layer being in direct contact with the polarizing plate, and (f) the polarizing plate, are sequentially stacked in this order on the substrate in a vertical direction perpendicular to the substrate,
allowing static electricity applied to the polarizing plate to flow to the second conductive layer that is in direct contact with the polarizing plate, and
allowing static electricity applied to the metal wires to flow to the first conductive layer that is in direct contact with the metal wires.
2. The touch detecting device according to claim 1, wherein each of the first conductive layer and the second conductive layer is a light-transmissive conductive layer.
3. The touch detecting device according to claim 1, wherein each of the first conductive layer and the second conductive layer contains tin oxide or indium oxide.
4. The touch detecting device according to claim 1, wherein
the touch detection electrode includes a sensor section and a dummy section, the dummy section being provided in a manner isolated from the sensor section,
the first conductive layer is seamlessly provided and overlaps the sensor section and the dummy section, and
(a) the first conductive layer having the first sheet resistance no less than the second sheet resistance and being in direct contact with both the sensor section and the dummy section, (b) the metal wires having a third sheet resistance that is less than each of the first sheet resistance and the second sheet resistance, and (c) the second conductive layer having the second sheet resistance no more than the first sheet resistance, are sequentially stacked in this order on the substrate in a vertical direction perpendicular to the substrate.

5. The touch detecting device according to claim 1, wherein the metal wires include at least one first thin wire and at least one second thin wire in a manner coupled with each other, the first thin wire forming a first angle with respect to a first direction, the second thin wire forming a second angle with respect to the first direction.

6. The touch detecting device according to claim 1, wherein
the metal wires are obtained by patterning a metal layer, and
the first conductive layer and the metal layer are stacked continuously.

7. The touch detecting device according to claim 6, wherein
the patterning of the metal layer includes etching, and
an etching rate for the first conductive layer is lower than an etching rate for the metal layer.

8. The touch detecting device according to claim 1, wherein the first conductive layer is provided on an entire surface of a display region.

9. A touch-detection capable display device comprising:
a touch detecting device according to claim 1;
a plurality of pixel electrodes provided on a plane parallel to the substrate and arranged opposing the touch detection electrode and in a matrix; and
a display function layer configured to be driven by an image signal.

10. The touch-detection capable display device according to claim 9, further comprising:
a drive electrode provided on a plane parallel to the substrate, the drive electrode being configured to generate a capacitance between the drive electrode and the touch detection electrode.

11. The touch-detection capable display device according to claim 9, further comprising:
a drive electrode provided on a plane parallel to the substrate, the drive electrode being configured to generate a transverse electric field between the drive electrode and the pixel electrodes, wherein
the display function layer is driven by the transverse electric field.

12. The touch detecting device according to claim 1, wherein
the touch detection electrode includes a sensor section and a dummy section,
the dummy section being provided in a manner isolated from the sensor section,
the first conductive layer is seamlessly provided and overlaps the sensor section and the dummy section, and
(a) the first conductive layer having the first sheet resistance that is less than a sheet resistance of the polarizing plate and that is no less than the second sheet resistance, the first conductive layer being in direct contact with both the sensor section and the dummy section, (b) the metal wires having the third sheet resistance that is less than each of the first sheet resistance and the second sheet resistance, (c) the protective layer, (d) the insulating layer, (e) the second conductive layer having the second sheet resistance that is less than a sheet resistance of the polarizing plate, and that is no more than the first sheet resistance, the second conductive layer being in direct contact with the polarizing plate, and (f) the polarizing plate, are sequentially stacked in this order on the substrate in the vertical direction,
allowing static electricity applied to the polarizing plate to flow to the sensor section and the dummy section through the second conductive layer that is in direct contact with the polarizing plate, and
allowing the static electricity reached to the dummy section to flow through the first conductive layer that is in direct contact with both the sensor section and the dummy section.

13. A touch detecting device comprising:
a substrate;
a touch detection electrode provided on a plane parallel to the substrate and including a plurality of metal wires;
a plurality of conductive layers including
a first conductive layer that overlaps the metal wires and that is in direct contact with the metal wires, the first conductive layer having a first sheet resistance, and
a second conductive layer provided above the metal wires, the second conductive layer having a second sheet resistance;
a protective layer;
a polarizing plate;
an insulating layer;
a cover substrate; and
a third conductive layer,
wherein
(a) the first conductive layer having the first sheet resistance no less than the second sheet resistance, (b) the metal wires having the third sheet resistance that is less than each of the first sheet resistance and the second sheet resistance, (c) the protective layer, (d) the insulating layer, (e) the second conductive layer having the second sheet resistance that is no ore more than the first sheet resistance, the second conductive layer being in direct contact with the polarizing plate, (f) the polarizing plate, (g) the cover substrate, and (h) the third conductive layer that is a touch surface of the touch detecting device, are sequentially stacked in this order on the substrate in the vertical direction,
allowing static electricity from a finger to flow through the third conductive layer and then return to the finger, and
allowing static electricity reached to the polarizing plate via the cover substrate to reach the second conductive layer through the polarizing plate that is in direct contact with the second conductive layer, then to the metal wires through the second conductive layer.

14. The touch detecting device according to claim 13, wherein
the touch detection electrode includes a sensor section and a dummy section,
the dummy section being provided in a manner isolated from the sensor section,
the first conductive layer is seamlessly provided and overlaps the sensor section and the dummy section, and
(a) the first conductive layer having the first sheet resistance no less than the second sheet resistance, the first conductive layer being in direct contact with both the sensor section and the dummy section, (b) the metal wires having the third sheet resistance that is less than each of the first sheet resistance and the second sheet resistance, (c) the protective layer, (d) the insulating layer, (e) the second conductive layer having the second sheet resistance that is no more than the first sheet resistance, the second conductive layer being in direct contact with the polarizing plate, (f) the polarizing plate, (g) the cover substrate, and (h) the third conductive layer that is a touch surface of the touch detecting device, are sequentially stacked in this order on the substrate in the vertical direction, allowing static electricity from a finger to flow through the third conductive layer and then return to the finger, allowing static electricity to reach the polarizing plate that is in direct contact with the second conductive layer via the cover substrate, then to reach the sensor section and the dummy section through the second conductive layer that is in direct contact with and the polarizing plate, allowing static electricity to flow from the dummy section to the first conductive layer and then to reach the sensor section, and allowing the static electricity reached to the dummy section to flow to a power supply and an GND.

15. A touch detecting device comprising:
a substrate;
a touch detection electrode provided on a plane parallel to the substrate and including a plurality of metal wires;
a plurality of conductive layers including
    a first conductive layer that overlaps the metal wires and that is in direct contact with the metal wires, the first conductive layer having a first sheet resistance, and
    a second conductive layer provided above the metal wires, the second conductive layer having a second sheet resistance;
a protective layer;
a polarizing plate;
an insulating layer; and
a cover substrate,
wherein
(a) the first conductive layer having the first sheet resistance no less than the second sheet resistance, (b) the metal wires having the third sheet resistance that is less than each of the first sheet resistance and the second sheet resistance, (c) the protective layer, (d) the insulating layer, (e) the polarizing plate, (f) the cover substrate, and (g) the second conductive layer that has the second sheet resistance that is no more than the first sheet resistance, the second conductive layer being is a touch surface of the touch detecting device, are sequentially stacked in this order on the substrate in the vertical direction, allowing static electricity from a finger to flow through the second conductive layer and then return to the finger, and allowing static electricity applied to a surface of the cover substrate from an outside to be transmitted to the metal wires through the second conductive layer, the cover substrate, the polarizing plate, the insulating layer, and the protective layer.

16. The touch detecting device according to claim 15, wherein the touch detection electrode includes a sensor section and a dummy section, the dummy section being provided in a manner isolated from the sensor section, the first conductive layer is seamlessly provided and overlaps the sensor section and the dummy section, and (a) the first conductive layer having the first sheet resistance no less than the second sheet resistance, the first conductive layer being in direct contact with both the sensor section and the dummy section, (b) the metal wires having the third sheet resistance that is less than each of the first sheet resistance and the second sheet resistance, (c) the protective layer, (d) the insulating layer, (e) the polarizing plate, (f) the cover substrate, and (g) the second conductive layer that has the second sheet resistance that is no more than the first sheet resistance, the second conductive layer being a touch surface of the touch detecting device, are sequentially stacked in this order on the substrate in the vertical direction, allowing static electricity from a finger to flow through the second conductive layer and then return to the finger, allowing static electricity applied to a surface of the cover substrate from an outside to be transmitted to the sensor section and the dummy section through the second conductive layer, the cover substrate, the polarizing plate, the insulating layer, and the protective layer, allowing static electricity to flow from the dummy section to the first conductive layer and then to reach the sensor section, and allowing the static electricity reached to the sensor section to flow to a power supply and an GND.

* * * * *